(12) United States Patent
Sugishima et al.

(10) Patent No.: US 7,650,682 B2
(45) Date of Patent: Jan. 26, 2010

(54) MANUFACTURING METHOD OF STATOR, AND STATOR

(75) Inventors: Kazushi Sugishima, Hamamatsu (JP); Akihiro Suzuki, Kosai (JP)

(73) Assignee: Asmo Co., Ltd (JP)

( * ) Notice: Subject to any disclaimer, the term of this patent is extended or adjusted under 35 U.S.C. 154(b) by 94 days.

(21) Appl. No.: 11/672,232

(22) Filed: Feb. 7, 2007

(65) Prior Publication Data
US 2007/0182271 A1    Aug. 9, 2007

(30) Foreign Application Priority Data
Feb. 7, 2006    (JP) .............................. 2006-030156

(51) Int. Cl.
*H02K 15/00*    (2006.01)
(52) U.S. Cl. .............................. 29/596; 29/597; 29/598; 29/605; 29/606; 242/361.1; 242/362.2; 242/363; 242/433.3; 310/194; 310/254.1; 310/264
(58) Field of Classification Search ........... 29/596–598, 29/605, 606, 732, 735; 242/361.1, 362.2, 242/363, 433.3; 310/194, 218, 254, 259, 310/264
See application file for complete search history.

(56) References Cited

U.S. PATENT DOCUMENTS 3,885,288 A * 5/1975 Lund ........................... 29/736
6,941,644 B2 * 9/2005 Shteynberg et al. ........... 29/605

FOREIGN PATENT DOCUMENTS

JP    2002-176753    6/2002

\* cited by examiner

*Primary Examiner*—Thiem Phan
(74) *Attorney, Agent, or Firm*—Sheridan Ross P.C.

(57) ABSTRACT

In a state in which a first divisional core and a second divisional core are arranged in a state spaced from each other and adjacent to each other, a first coil and a second coil are each wound around a tooth. The first coil and the second coil are in the same phase. In a state in which a plurality of divisional cores are arranged annularly so that their teeth are oriented in a radially inward direction, the first divisional core and the second divisional core are not adjacent to each other in the circumferential direction. A plurality of connection wires are shaped to converge at an end surface of a stator core. This facilitates the winding of the coils around the divisional cores. Further, the connection wires can be shortened.

12 Claims, 24 Drawing Sheets

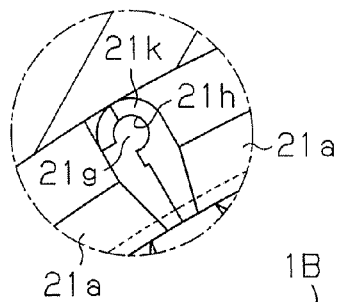
Fig.1B
Fig.1A
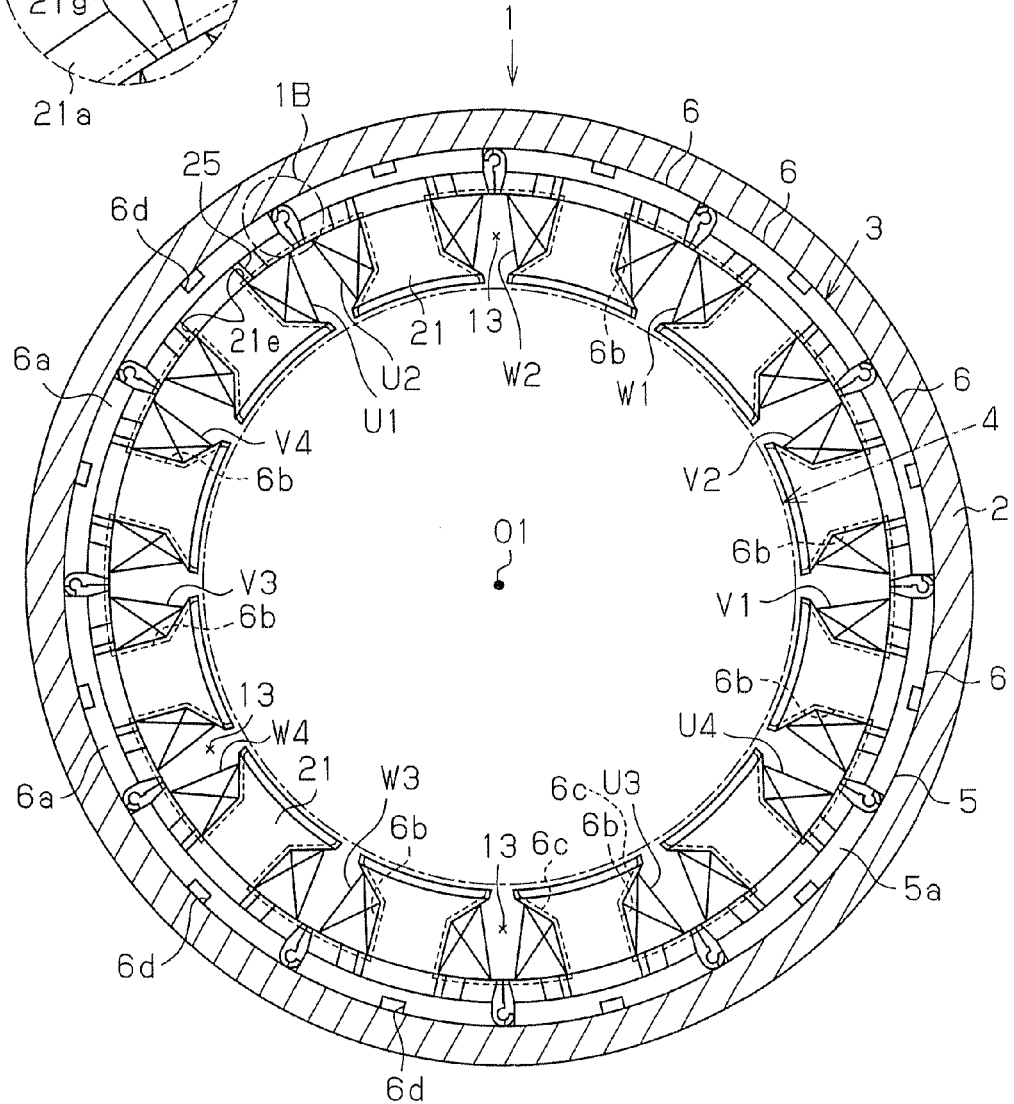

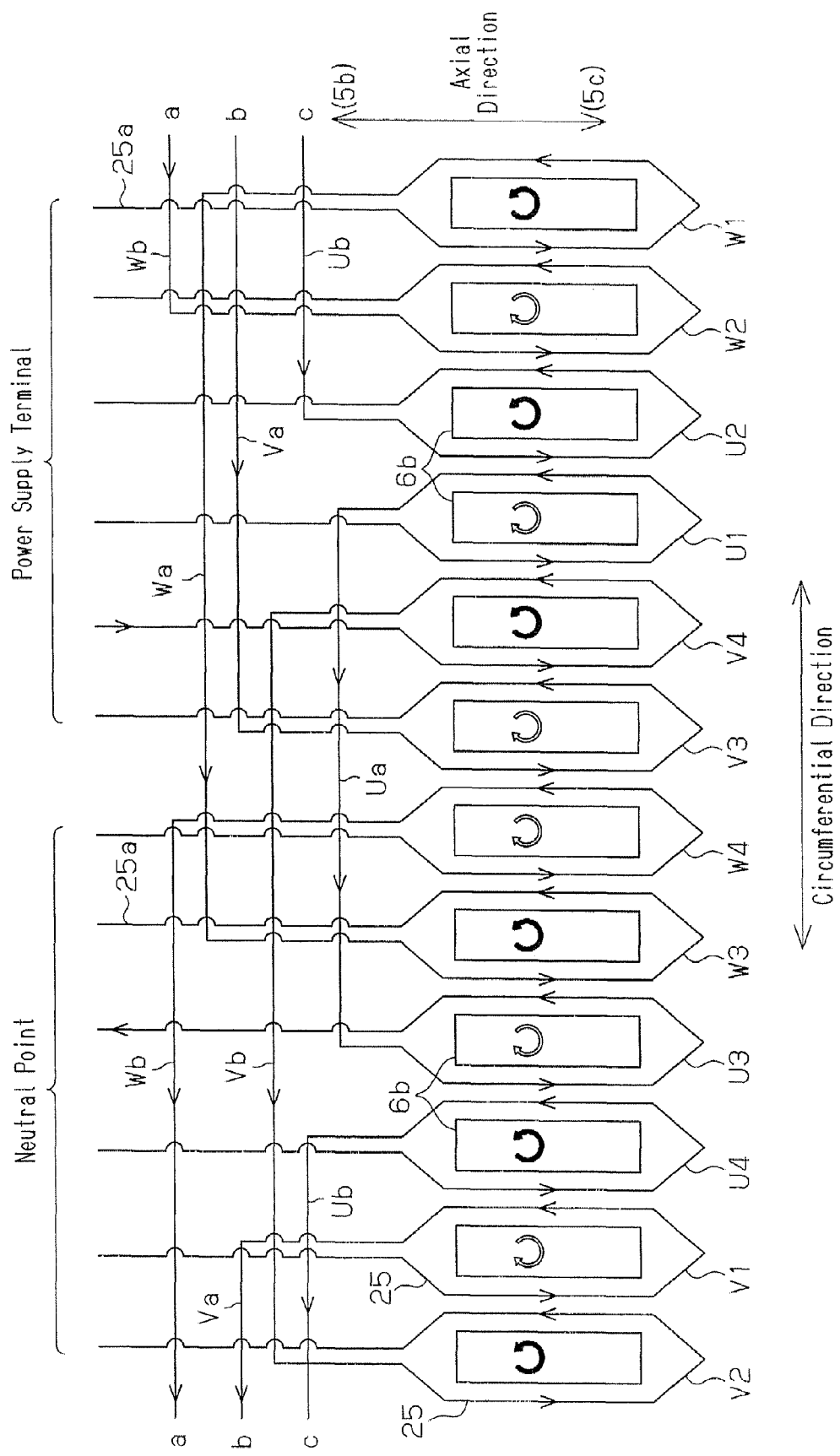

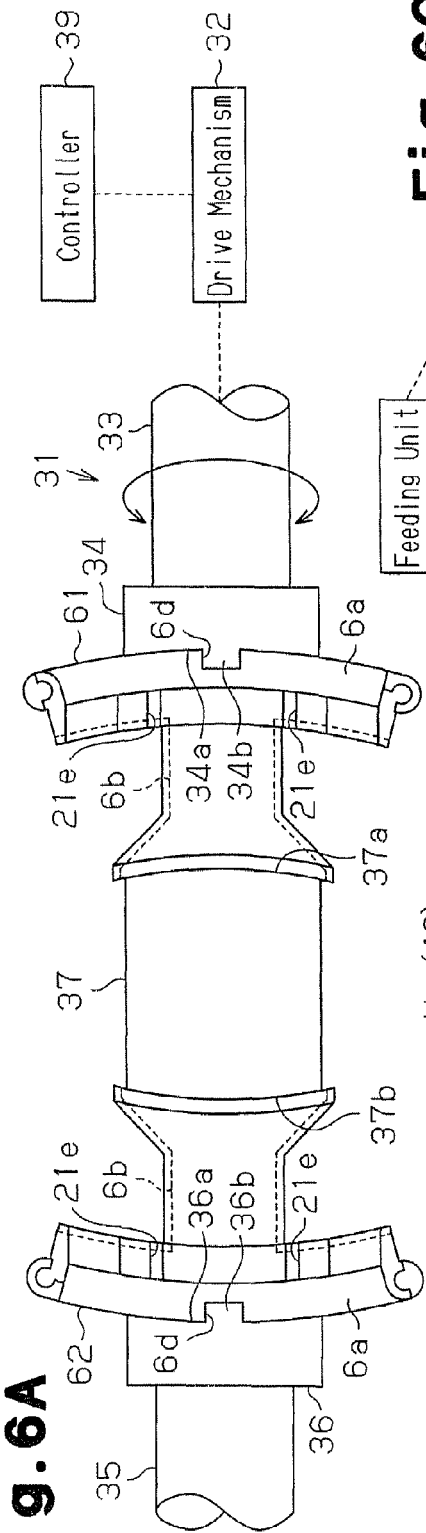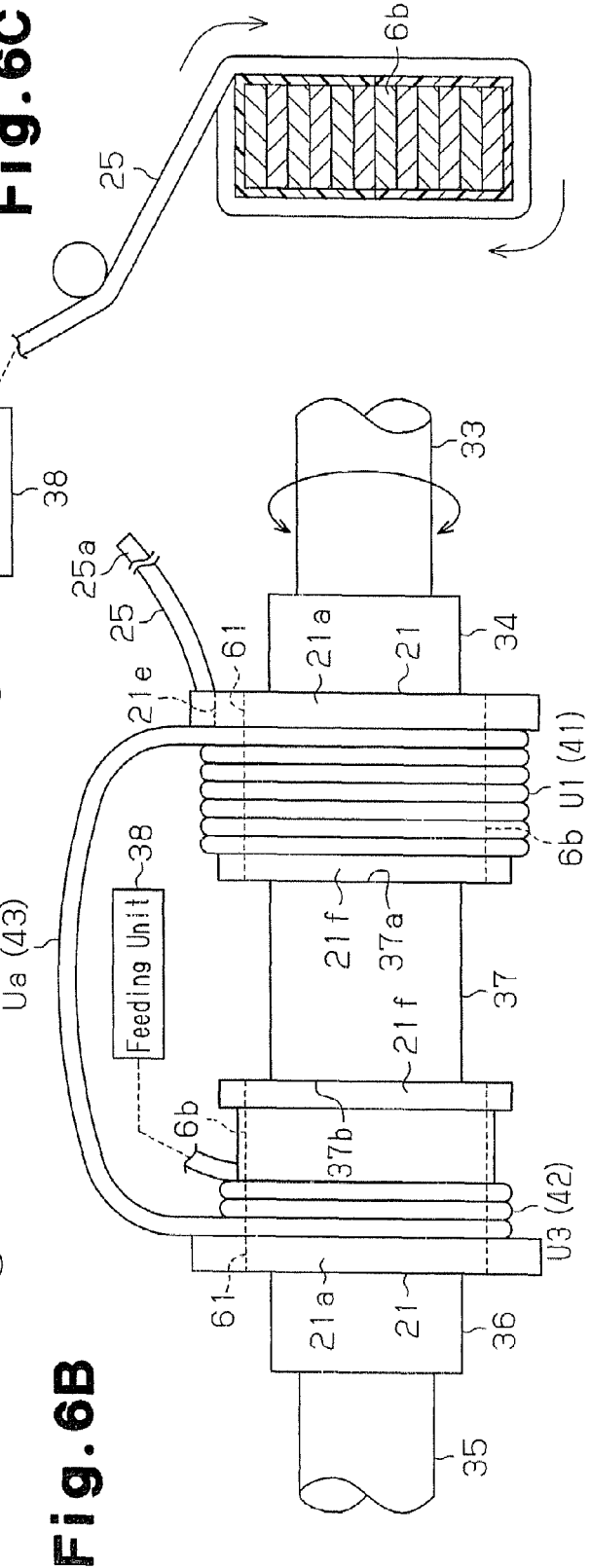

and Stator

MANUFACTURING METHOD OF STATOR, AND STATOR

CROSS-REFERENCE TO RELATED DOCUMENTS

This application claims the benefit of Japan Patent Application No. 2006-030156, filed Feb. 07, 2006.

BACKGROUND OF THE INVENTION

The present invention relates to a method for manufacturing a stator and a stator manufactured with the manufacturing method.

Japanese Laid-Open Patent Publication No. 2002-176753 describes a method for manufacturing a stator for an inner-rotor type rotating electrical machine. The stator has an annular stator core. The stator core includes an annular portion and a plurality of teeth extending radially inward from the annular portion. A coil is wound around each tooth. A connection wire extends from one coil to another coil.

The stator core may be divided into a plurality of divisional cores to increase the lamination factor of the coils. The divisional cores are formed by dividing the stator core in the circumferential direction. Each divisional core has a single tooth.

The above publication discloses a first winding method and a second winding method for forming coils. With the first winding method, the plurality of divisional cores are arranged in a single line so that their teeth are parallel to one another. A film insulator extends at a basal end of each tooth between the two sides in the circumferential direction. A gap is formed between adjacent divisional cores so that their film insulators overlap each other. In this state, a wire is wound continuously around the teeth to form a coil on each tooth.

With the second winding method, the divisional cores are arranged so that adjacent divisional cores are connected to each other so that they are pivotal relative to one another. In this state, the plurality of divisional cores are arranged annularly so that their teeth are oriented in an outward direction. In this state, a wire is wound continuously around the teeth to form a coil on each tooth. After the coils are formed, the divisional cores are reversed in a manner that their teeth are oriented in a radially inward direction.

With the first winding method, the gap formed between the adjacent divisional cores is determined by the dimensions of their film insulators in the circumferential direction. In other words, the gap between the adjacent divisional cores is relatively small. As a result, space formed on the two sides of each tooth is greater in this arrangement than in the assembled state of the stator core. However, even with such greater space, teeth or coils adjacent to a tooth around which the wire is to be wound may interfere with the wire winding operation of the tooth.

With the second winding method, greater space is formed on the two sides of each tooth as compared with when the first winding method is used. However, each tooth still has a pair of divisional cores arranged on the two sides of the tooth. Such adjacent teeth or coils may interfere with the wire winding operation of each tooth. In this way, the first winding method and the second winding method both fail to provide sufficient space permitting smooth wire winding operations on the teeth.

With both the first winding method and the second winding method, the plurality of divisional cores are simultaneously moved and arranged annularly after the coils are wound. Thus, the connection wires need to be long enough to permit such movement of the divisional cores. In other words, each connection wire needs to be longer than the circumferential direction distance between two divisional cores that are connected by the connection wire in the assembled state of the stator core. Further, with the first winding method, the gap formed between the adjacent divisional cores further lengthens each connection wire.

The electric resistance of each connection wire increases and the motor efficiency decreases as each connection wire becomes longer. Further, long connection wires require a complicated process for shaping the connection wires after the divisional cores are moved and arranged annularly. Moreover, long connection wires increase the size of the stator in the axial direction.

The connection wires may be eliminated by using a bus bar or a current supply wire to electrically connect the coils to one another. However, the use of a bus bar or a current supply wire increases the number of components and increases the number of processes.

SUMMARY OF THE INVENTION

It is an object of the present invention to provide a method for manufacturing a stator and a stator that facilitate the winding of coils around divisional cores and enable connection wires to be shortened.

One aspect of the present invention is a method for manufacturing a stator including a plurality of teeth and a plurality of coils that are wound around the plurality of teeth. The plurality of coils form at least one phase. The manufacturing method includes preparing a plurality of divisional cores. Each divisional core has a tooth. The plurality of divisional cores include a first divisional core and a second divisional core, and the first divisional core and the second divisional core are not adjacent to each other in the circumferential direction when the plurality of divisional cores are arranged annularly so that corresponding teeth are oriented in a radially inward direction. The first divisional core and the second divisional core are arranged in a state spaced from and adjacent to each other. A first coil is wound around the tooth of the first divisional core in a concentrated winding. A second coil is wound around the tooth of the second divisional core in a concentrated winding. The first coil is connected to the second coil by a connection wire. The first coil and the second coil are included in the plurality of coils, and the first coil and the second coil are in the same phase. A stator core is formed so that the plurality of teeth extend radially. The plurality of divisional cores are arranged annularly in a state in which the coils are wound around the divisional cores. The stator core defines an axial direction. The stator core has an end surface intersecting the axial direction. The connection wire is shaped to converge at the end surface of the stator core.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1A is a horizontal cross-sectional view of a brushless motor according to a first embodiment of the present invention;

FIG. 1B is an enlarged view showing the engagement between two divisional cores shown in FIG. 1A;

FIG. 4 is a development view of a plurality of coils and a plurality of connection wires shown in FIG. 1A;

FIG. 6A is a plan view showing two divisional cores shown in FIG. 1A that are held by a winding machine;

FIG. 6B is a plan view showing a process for winding a wire around two teeth shown in FIG. 6A;

FIG. 6C is a cross-sectional view of a tooth shown in FIG. 6B;

DETAILED DESCRIPTION OF THE PREFERRED EMBODIMENTS

Figure 2A:
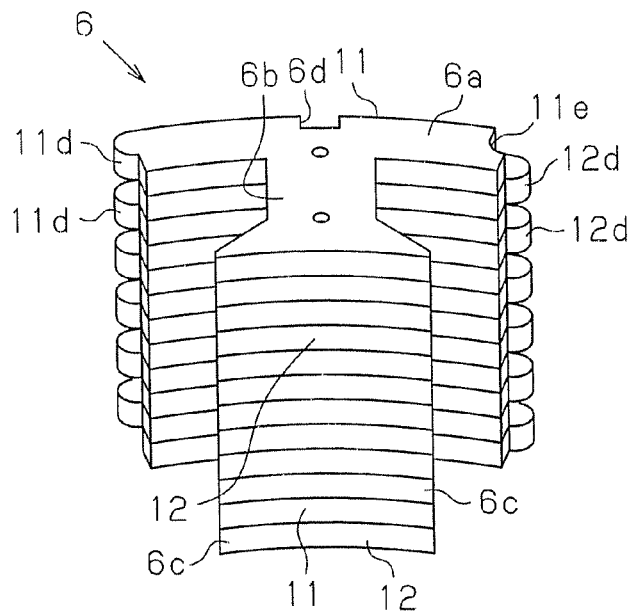
FIG. 2A is a perspective view of a divisional core shown in FIG. 1A.

A first embodiment of the present invention will now be described with reference to FIGS. 1A to 13.

FIG. 1A shows an inner rotor type brushless motor 1 according to a first embodiment of the present invention. The brushless motor 1 includes a housing case 2, a stator 3, and a rotor 4. The housing case 2 is cylindrical and has a closed bottom. The stator 3, which is cylindrical, is pressed fitted into the housing case 2 and fixed to the housing case 2. The rotor 4 is rotatably accommodated in the radially inward direction of the stator 3.

The rotor 4 shown by alternatively long and short dashed lines includes a plurality of magnets (not shown) that are arranged in the circumferential direction. The magnets face the stator 3. The stator 3 has a center axis O1.

The stator 3 has a cylindrical stator core 5, which is press fitted into the housing case 2 and fixed to an inner circumferential surface of the housing case 2. The stator core 5 includes twelve divisional cores 6 that are arranged in the circumferential direction. Each divisional core 6 is T-shaped as viewed in the axial direction. The stator core 5 has twelve teeth 6b that extend radially. Each tooth 6b extends radially inward from the stator core 5. A center axis of the stator core 5 coincides with the center axis O1.

As shown in FIGS. 1A and 2A, each divisional core 6 includes an arcuate portion 6a, which serves as a divisional annular portion, and a single tooth 6b, which extends orthogonal to the circumferentially middle part of the arcuate portion 6a. The stator core 5 includes an annular portion 5a that is formed by joining the plurality of arcuate portions 6a. Two teeth 6b that are adjacent to each other in the circumferential direction define a slot 13. The stator 3 has twelve slots 13. The teeth 6b are formed integrally with the arcuate portions 6a. Each divisional core 6 includes a pair of projecting portions 6c that project from the two circumferential sides at the distal end of the corresponding tooth 6b. Each projecting portion 6c has the shape of a triangular pole and is formed integrally with the tooth 6b. An engagement groove 6d, which is rectangular and extends in the axial direction, is formed on the outer circumferential surface of the arcuate portion 6a.

As shown in FIG. 2A, each divisional core 6 includes a plurality of first lamination members 11 and a plurality of second lamination members 12 that are alternately laminated with one another. The first lamination members 11 are T-shaped plates. The second lamination members 12 are shaped to be symmetric to the first lamination members 11.

Figure 2B:
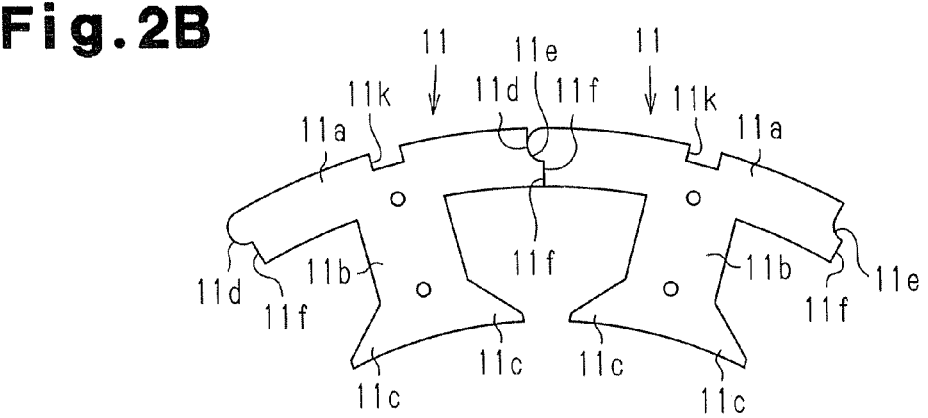
FIG. 2B is a plan view showing two first lamination members shown in FIG. 2A that are engaged with each other.

As shown in FIG. 2B, each first lamination member 11 includes a laminated arcuate portion 11a, a laminated tooth portion 11b, and a pair of laminated projecting portions 11c. The laminated arcuate portion 11a is arcuate and forms part of the arcuate portion 6a. The laminated tooth portion 11b forms part of the tooth 6b. The laminated projecting portions 11c form parts of the projecting portions 6c. The laminated arcuate portion 11a, the laminated tooth portion 11b, and the laminated projecting portions 11c are formed integrally with one another. The laminated tooth portion 11b, which is box-shaped, extends orthogonal to the laminated arcuate portion 11a. The two laminated projecting portions 11c project from the two circumferential sides at the distal end of the laminated tooth portion 11b.

As shown in FIG. 2B, the laminated arcuate portion 11a includes a round projection 11d and a round recess 11e. The round projection 11d projects from a first end (left end) of the laminated arcuate portion 11a in the circumferential direction. The round recess 11e is formed on a second end (right end) of the laminated arcuate portion 11a in the circumferential direction. The first end has a contact surface 11f that extends radially inward from the round projection 11d. The second end also has a contact surface 11f that extends radially inward from the round recess 11e. The round projection 11d of one first lamination member 11 is fitted into the round recess 11e of another first lamination member 11 from the radially outward direction. The laminated arcuate portion 11a has an engagement recess 11k, which forms the engagement groove 6d.

When the round projection 11d of a first lamination member 11 located at the right is accommodated in the round recess 11e of a first lamination member 11 located at the left, as viewed in FIG. 2B, the two first lamination members 11 are pivotal relative to each other. Contact between the contact surfaces 11f of the two first lamination members 11 restricts relative pivoting of the two first lamination members 11.

Figure 2C:
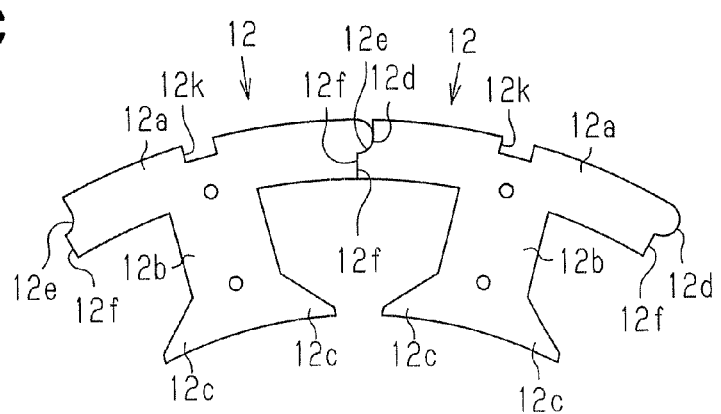
FIG. 2C is a plan view showing two second lamination members shown in FIG. 2A that are engaged with each other.

As shown in FIG. 2C, the second lamination members 12 are line-symmetric to the first lamination members 11. More specifically, the second lamination members 12 are reverse to the first lamination members 11. Each second lamination member 12 includes a laminated arcuate portion 12a, a laminated tooth portion 12b, and a pair of laminated projecting portions 12c that are formed integrally with one another.

Each second lamination member 12 further includes a round projection 12d and a contact surface 12f at the right as viewed in FIG. 2C, and a round recess 12e and a contact surface 12f at the left as viewed in FIG. 2C. The laminated arcuate portion 12a has an engagement recess 12k.

As shown in FIG. 2A, the plurality of first lamination members 11 and the plurality of second lamination members 12 are laminated alternately in the thicknesswise direction, that is, the axial direction. In this state, the first lamination members 11 and the second lamination members 12 are swaged together. Each divisional core 6 is formed by pressing the alternately laminated first and second lamination members 11 and 12 together.

As shown in FIG. 1A, a gap is formed between two projecting portions 6c that are adjacent to each other in the circumferential direction. Each divisional core 6 is covered by a pair of insulators 21 from its two axial sides. More specifically, the stator 3 has a total of twenty-four insulators 21. With each divisional core 6 being covered by two of the insulators 21, distal end surfaces 6e of the teeth 6b and outer circumferential surfaces of the arcuate portions 6a are exposed. A wire 25 is wound around the insulators 21 through concentrated winding to form coils U1 to U4, V1 to V4, and W1 to W4 on the teeth 6b. The outer surface of the wire 25 is coated by an insulating film.

Figure 3A:
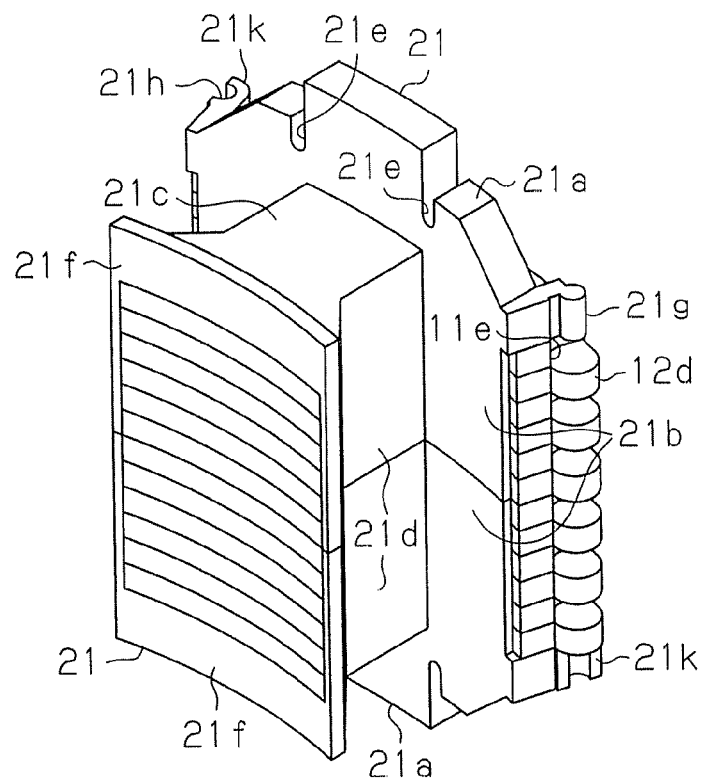
FIG. 3A is a perspective view of a divisional core to which an insulator shown in FIG. 1A has been attached.
Figure 3B:
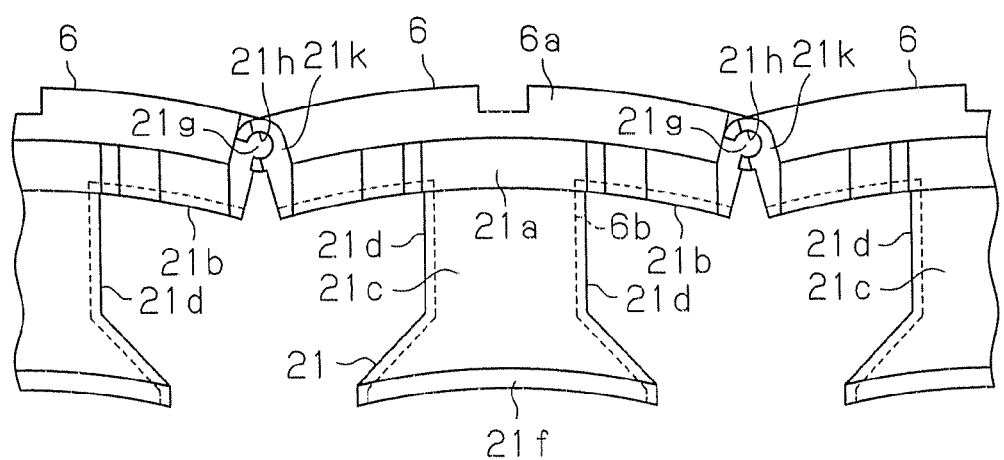
FIG. 3B is a plan view showing three divisional cores shown in FIG. 1A that are connected to one another.

The insulators 21 insulate the coils U1 to W4 from the divisional cores 6. Each insulator 21 is formed from an insulative resin material. As shown in FIGS. 3A and 3B, each insulator 21 includes an axial cover 21c, a pair of side covers 21d, an outer wall 21a, an inner cover 21b, and an inner wall 21f. The axial cover 21c covers the corresponding tooth 6b in the axial direction. The side covers 21d cover the two side surfaces of the corresponding tooth 6b. The outer wall 21a covers the corresponding arcuate portion 6a in the axial direction. The inner cover 21b covers an inner circumferential surface of the corresponding arcuate portion 6a. The inner wall 21f extends in the axial direction from the distal end of the corresponding tooth 6b. Each insulator 21 has an integral structure. The inner wall 21f functions as an inward restriction wall that prevents the coils U1 to W4 from overhanging radially inward.

The outer wall 21a extends in the axial direction to prevent the coils U1 to W4 from overhanging radially outward. The outer wall 21a has a pair of engagement grooves 21e. As shown in FIG. 1A, each engagement groove 21e accommodates the part of the wire 25 that extends from the corresponding one of the coils U1 to W4. Each engagement groove 21e extends from the axially distal end of the outer wall 21a toward an axially basal end of the outer wall 21a.

As shown in FIGS. 3A and 3B, the outer wall 21a includes a connecting projection 21g and an accommodating portion 21k. The connecting projection 21g is arranged on a first end of the outer wall 21a in the circumferential direction, that is, a right end in FIG. 3B. The accommodating portion 21k is arranged on a second end of the outer wall 21a, that is, a left end in FIG. 3B. The connecting projection 21g is cylindrical and extends in the axial direction. The center axis of the connecting projection 21g coincides with the center axis of the round projection 12d. The radius of the connecting projection 21g is smaller than the radius of curvature of the round recess 12e.

The accommodating portion 21k has an arcuate connecting recess 21h for accommodating the connecting projection 21g. The arc of the accommodating portion 21k extends over an angle slightly greater than 180 degrees as viewed in the axial direction. The center axis of the accommodating portion 21k coincides with the center axis of the round recess 11e. The radius of curvature of the outer diameter of the accommodating portion 21k is equal to the radius of curvature of the round projection 11d.

As viewed in FIG. 3B, the divisional core 6 at the left of two adjacent divisional cores 6 is referred to as the first divisional core 61 and the divisional core 6 at the right is referred to as the second divisional core 62. The insulators 21 attached to the first divisional core 61 are referred to as the first insulators 21, and the insulators 21 attached to the second divisional core 62 are referred to as the second insulators 21. The connecting projection 21g and the connecting recess 21h are resiliently deformed to fit the connecting projection 21g of the first insulator 21 into the connecting recess 21h of the second insulator 21. As a result, the adjacent first and second insulators 21 are pivotal relative to each other about the center axis of the connecting projection 21g. The connection between the connecting projection 21g and the accommodating portion 21k is not strong and enables easy detachment.

As shown in FIG. 1A, coils U1 (located at the top left part in FIG. 1A), U2, W2, W1, V2, V1, U4, U3, W3, W4, V3, and V4 are wound around the twelve teeth 6b clockwise in the stated order when viewing the stator 3 in the axial direction. The coils U1 to U4 are of the same phase (U-phase). The coils V1 to V4 are of another phase (V-phase) The coils W1 to W4 are of still another phase (W-phase).

As shown in FIG. 4, the coils U1 to U4, V1 to V4, and W1 to W4 are all wound counterclockwise as viewed from the distal ends of the teeth 6b.

Figure 5:
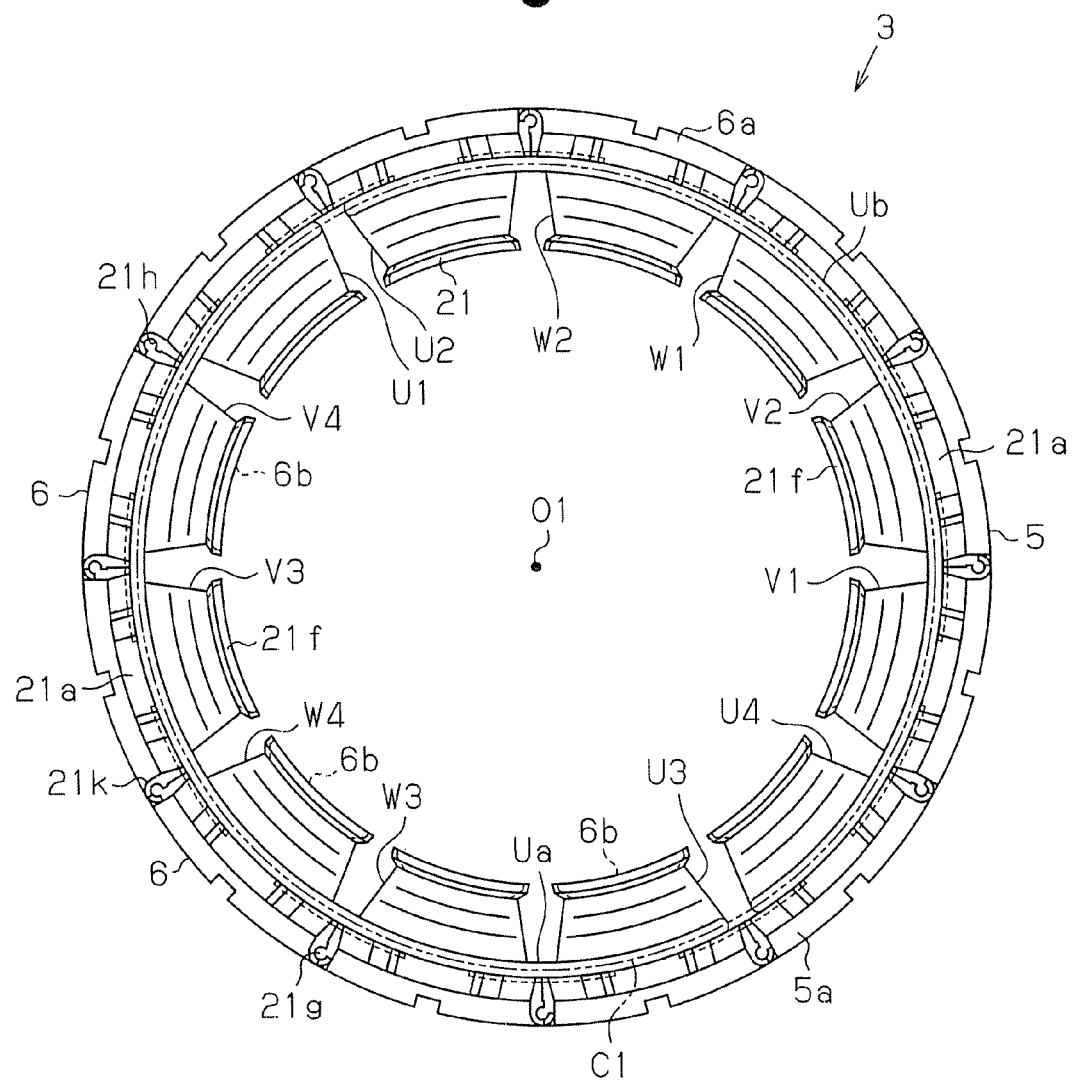
FIG. 5 is a plan view of a stator shown in FIG. 1A.
Figure 7:
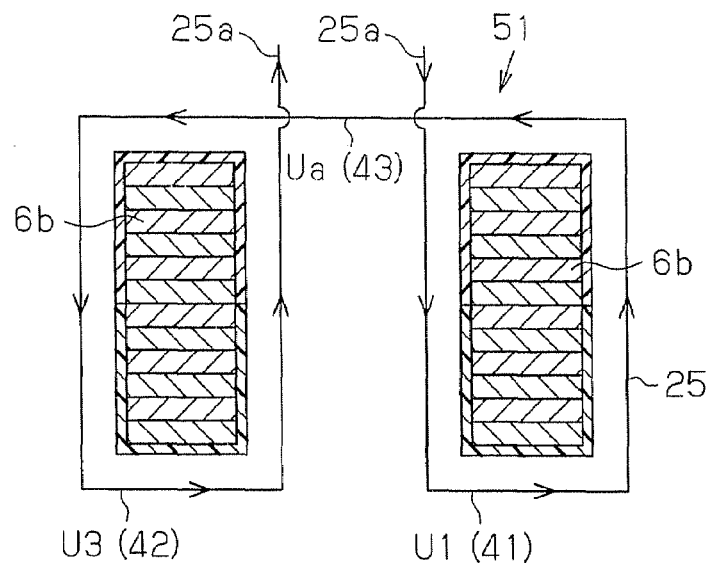
FIG. 7 is a cross-sectional view showing a winding path of a wire shown in FIG. 6B.

A first connection wire Ua crosses the coils V4, V3, W4, and W3 to extend from the coil U1 to the coil U3. As shown in FIG. 7, the first connection wire Ua in the first embodiment also crosses the coils U1 and U3 that are connected by the first connection wire Ua. More specifically, the first connection wire Ua crosses six coils in total, that is, the coils U1, V4, V3, W4, W3, and U3. The coils V4, V3, W4 and W3 between the coils U1 and U3 are intermediate coils of the first connection wire Ua. Hereafter, the intermediate coils may be referred to as intermediate coils 63. A second connection wire Ub crosses the coils V1, V2, W1, and W2 to extend from the coil U4 to the coil U2. The second connection wire Ub in the first embodiment also crosses the coils U4 and U2. More specifically, the second connection wire Ub crosses six coils in total, that is, the coils U4, V1, V2, W1, W2, and U2. The coils V1, V2, W2, and U2 are intermediate coils of the second connection wire Ub. As shown in FIG. 5, the connection wires Ua and Ub extend in an arcuate manner along a hypothetical circle C1 of which center is the center axis O1 as viewed in the axial direction of the stator 3. The hypothetical circle C1 and the connection wires Ua and Ub are located between the outer wall 21a and the inner wall 21f. The connection wires Ua and Ub are shown by exaggerated thick lines in FIG. 5.

As shown in FIG. 4, a third connection wire Va crosses the coils V2, W1, W2, U2, U1, and V4 to extend from the coil V1 to the coil V3. The third connection wire Va in the first embodiment also crosses the coils V1 and V3. More specifically, the third connection wire Va crosses eight coils in total, that is, the coils V1, V2, W1, W2, U2, U1, V4, and V3. The coils V2, W1, W2, U2, U1, and V4 between the coils V1 and V3 are intermediate coils of the third connection wire Va. Likewise, a fourth connection wire Vb crosses the coils V3, W4, W3, U3, U4, and V1 to extend from the coil V4 to the coil V2. The fourth connection wire Vb in the first embodiment also crosses the coils V4 and V2. More specifically, the fourth connection wire Vb crosses eight coils in total, that is, the coils V4, V3, W4, W3, U3, U4, V1, and V2. The coils V3, W4, W3, U3, U4, and V1 between the coils V4 and V2 are intermediate coils of the fourth connection wire Vb. Like the connection wires Ua and Ub, each of the connection wires Va and Vb is located between the outer wall 21a and the inner wall 21f. Each of the connection wires Va and Vb extend in an arcuate manner about the center axis O1 as viewed in the axial direction. FIG. 5 does not show the connection wires Va and Vb.

As shown in FIG. 4, a fifth connection wire Wa crosses the coils W2, U2, U1, V4, V3, and W4 to extend from the coil W1 to the coil W3. The fifth connection wire Wa in the first embodiment also crosses the coils W2 and W4. More specifically, the fifth connection wire Wa crosses eight coils in total, that is, the coils W1, W2, U2, U1, V4, V3, W4, and W3. The coils W2, U2, U1, V4, V3, and W4 between the coils W1 and W3 are intermediate coils of the fifth connection wire Wa. Likewise, a sixth connection wire Wb crosses the coils W3, U3, U4, V1, V2, and W1 to extend from the coil W4 to the coil W2. The sixth connection wire Wb in the first embodiment also crosses the coils W4 and W2. More specifically, the sixth connection wire Wb crosses eight coils in total, that is, the coils W4, W3, U3, U4, V1, V2, W1, and W2. The coils W3, U3, U4, V1, V2, and W1 between the coils W4 and W2 are intermediate coils of the sixth connection wire Wb. Like the connection wires Ua and Ub, each of the connection wires Wa and Wb is between the outer wall 21a and the inner wall 21f. Each of the connection wires Wa and Wb extends in an arcuate manner about the center axis O1 as viewed in the axial direction. FIG. 5 does not show the connection wires Wa and Wb.

As shown in FIG. 4, the coils V2, V1, U4, U3, W3, and W4 are arranged in the circumferential direction. Lead wires 25a extending from the six coils V2 to W4 are electrically connected to one another to form a neutral point. The coils V3, V4, U1, U2, W2, and W1 are also arranged in the circumferential direction. Lead wires 25a extending from the six coils V3 to W1 are electrically connected to a power supply terminal. The power supply terminal is connected to an external power supply.

Figure 13:
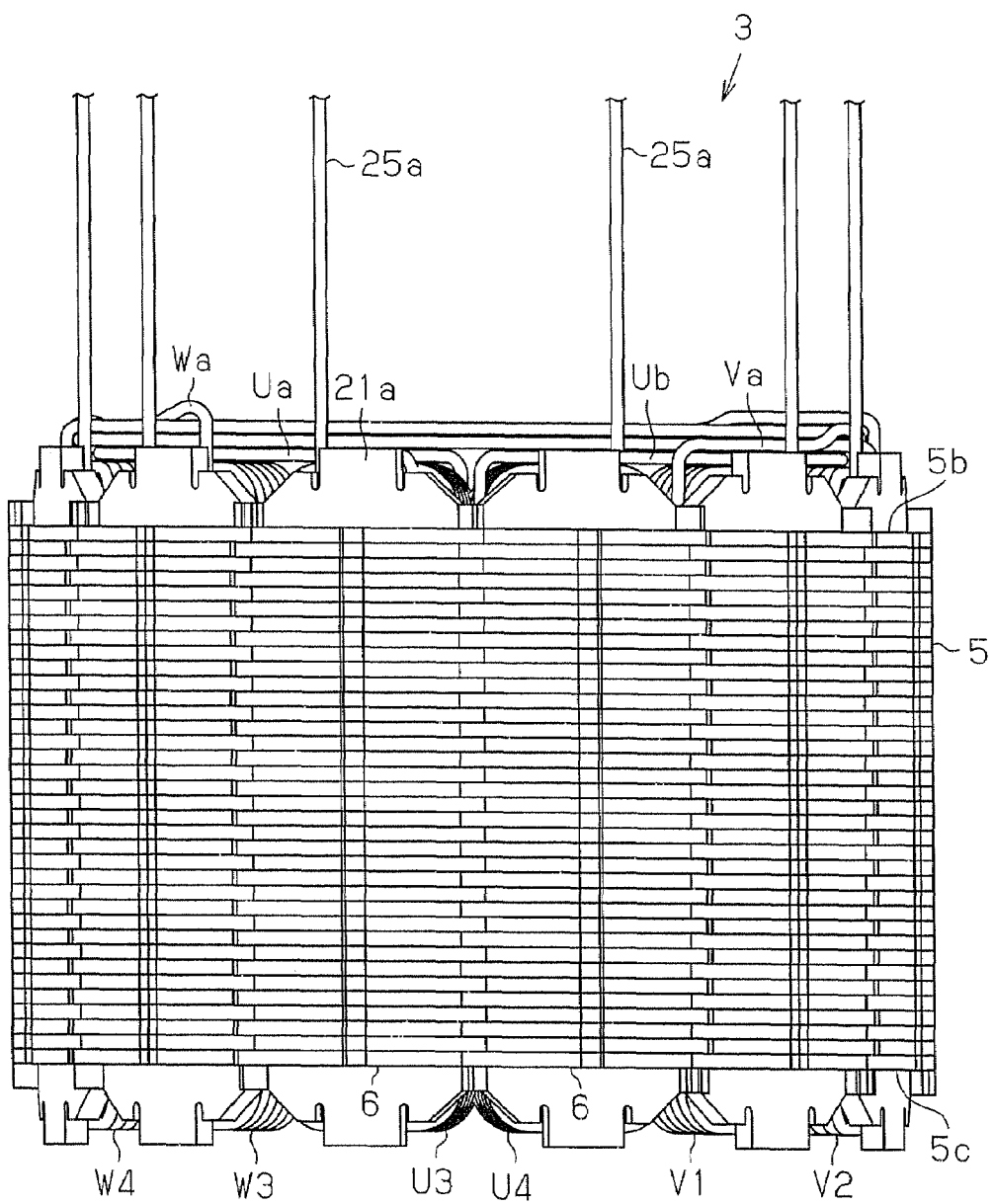
FIG. 13 is a side view of the stator of FIG. 12.

As shown in FIGS. 11A, 11B, and 13, the stator core 5 has a first end surface 5b in the axial direction and a second end surface 5c in the axial direction opposite the first end surface 5b. The connection wires Ua to Wb are arranged on the first end surface 5b. The lead wires 25a extend from the first end surface 5b. The neutral point and the power supply terminal are arranged on the first end surface 5b.

When the coils U1 to W4 of the brushless motor 1 are supplied with current, the stator 3 generates a rotating magnetic field. As a result, the rotor 4 starts rotating. Coils supplied with current are sequentially switched in accordance with the rotational position of the rotor 4. In FIG. 4, the shaded arrows and the non-shaded arrows each indicate the direction of the current flow. Current flows in the same direction as the winding direction of the wire 25 in the coils V2, U4, W3, V4, U2, and W1 indicated by the shaded arrows. Current flows in the direction opposite to the winding direction of the wire 25 in the coils V1, U3, W4, V3, U1, and W2 indicated by the non-shaded arrows.

A method for manufacturing the stator 3 will now be described.

The manufacturing method includes a divisional-core formation process, a wire winding process, an assembling process, and a connecting-wire shaping process.

First, divisional cores 6 are formed in the divisional-core formation process. A pressing machine (not shown) punches out the first lamination members 11 and second lamination members 12 from a metal plate. The first lamination members 11 and the second lamination members 12 are laminated alternately in the thicknesswise direction. The alternately laminated first and second lamination members 11 and 12 are pressed together and integrated with one another. This completes the divisional cores 6. A pair of insulators 21 is attached to each completed divisional core 6 from its two sides of the axial direction.

Next, a wire 25 is wound around teeth 6b of the divisional cores 6 in the wire winding process. A spindle winding machine 31 shown in FIG. 6A is used to wind the coils U1 to W4 around the corresponding teeth 6b. The winding machine 31 holds two divisional cores 6 at the same time. With the two divisional cores 6, the winding machine 31 first winds a first coil around the first divisional core 61 and then winds a second coil around the second divisional core 62. Hereafter, the first coil is the coil U1, and the second coil is the coil U3. The first coil may be referred to as the coil 41, and the second coil may be referred to as the coil 42. The tooth of the first divisional core 61 may be referred to as the first tooth 6b, and the tooth of the second divisional core 62 may be referred to as the second tooth 6b. A connection wire connecting the first and second coils may be referred to as a connection wire 43.

As shown in FIG. 6A, the winding machine 31 includes a drive shaft 33, an auxiliary shaft 35 driven by the drive shaft 33, an intermediate holding unit 37 arranged between the drive shaft 33 and the auxiliary shaft 35, a drive mechanism 32 for driving the drive shaft 33, and a controller 39 for controlling the drive mechanism 32. The winding machine 31 further includes a feeding unit 38 for feeding the wire 25 as shown in FIG. 6.

The drive shaft 33 and the intermediate holding unit 37 hold the first divisional core 61. The auxiliary shaft 35 and the intermediate holding unit 37 hold the second divisional core 62. The drive shaft 33 rotates the first divisional core 61, the intermediate holding unit 37, the second divisional core 62, and the auxiliary shaft 35 in synchronization with one another. The auxiliary shaft 35 is arranged coaxially with the drive shaft 33.

The first holding unit 34 is arranged on a distal end of the drive shaft 33 in a manner that the first holding unit 34 is rotated integrally with the drive shaft 33. The first holding unit 34 includes a first holding surface 34a and a first engagement projection 34b. The first engagement projection 34b projects from the first holding surface 34a and extends in a radial direction of the drive shaft 33. The first holding unit 34 holds the arcuate portion 6a of the first divisional core 61. The first holding surface 34a is curved to correspond to the outer circumferential surface of the arcuate portion 6a. The first engagement projection 34b is engagable with the engagement groove 6d of the first divisional core 61.

A second holding unit 36, which is identical to the first holding unit 34, is arranged on a distal end of the auxiliary shaft 35 in a manner that the second holding unit 36 is rotated integrally with the auxiliary shaft 35. The second holding unit 36 has a second holding surface 36a and a second engagement projection 36b. The second holding unit 36 holds an arcuate portion 6a of the second divisional core 62.

The intermediate holding unit 37 has a first intermediate holding surface 37a and a second intermediate holding surface 37b, which are curved to correspond to a distal end of the corresponding tooth 6b.

The auxiliary shaft 35 is movable with respect to the drive shaft 33. This enables adjustment of the distance between the first holding surface 34a and the first intermediate holding surface 37a. Likewise, the distance between the second holding surface 36a and the second intermediate holding surface 37b is also adjustable. Thus, the first divisional core 61 and the second divisional core 62 are easily set on or removed from the winding machine 31.

The first holding unit 34 and the intermediate holding unit 37 hold the first divisional core 61 to which the insulators 21 have been attached. Likewise, the second holding unit 36 and the intermediate holding unit 37 hold the second divisional core 62 to which the insulators 21 have been attached.

More specifically, the distal end surface 6e of the first tooth 6b faces the distal end surface 6e of the second tooth 6b. As shown in FIG. 6A, the first holding unit 34, the second holding unit 36, and the intermediate holding unit 37 integrally rotate the first divisional core 61 and the second divisional core 62.

The first divisional core 61 and the second divisional core 62 are not adjacent to each other in the circumferential direction when the stator 3 is assembled. In the wire winding process, the coils of the same phase are wound around the first divisional core 61 and the second divisional core 62. No other divisional core 6 is arranged between the first divisional core 61 and the second divisional core 62 when the first divisional core 61 and the second divisional core 62 have been arranged adjacent to each other. Further, the first divisional core 61 and the second divisional core 62 may be oriented in any directions when the first divisional core 61 and the second divisional core 62 have been arranged adjacent to each other.

As shown in FIG. 6B, the wire 25 supplied from the feeding unit 38 is first engaged with the engagement groove 21e of the first divisional core 61. Then, the drive shaft 33 is rotated to wind the wire 25 around the first tooth 6b of the first divisional core 61 and form the first coil U1. As shown in FIG. 6C, the drive shaft 33 rotates clockwise as viewed from the distal end of the first tooth 6b. The wire 25 is wound around the first tooth 6b counterclockwise as viewed from the distal end of the tooth 6b. The clockwise rotation of the drive shaft 33 is stopped when the first coil U1 is completely formed.

The part of the wire 25 that extends from the engagement groove 21e in the direction opposite to the first coil U1 forms a lead wire 25a. The lead wire 25a is cut to have a predetermined length.

Next, the wire 25 is wound continuously to form the second coil U3 after the first coil U1 is formed. In other words, the wire 25 is not cut after the first coil U1 is formed and continuously wound around the second tooth 6b. The part of the wire 25 extending from the first coil U1 to the second coil U3 functions as the connection wire Ua. The length of the connection wire Ua is set in a manner that the connection wire Ua extends in an arcuate manner along a hypothetical circle C1 when the first divisional core 61 and the second divisional core 62 are assembled together to form the stator 3.

When the wire 25 is wound around the second tooth 6b of the second divisional core 62, the drive shaft 33 rotates counterclockwise as viewed in FIG. 6C. In other words, the drive shaft 33 rotates in the direction reverse to the direction in which the drive shaft 33 rotates to wind the wire 25 around the first tooth 6b. More specifically, the wire 25 is wound around the second tooth 6b counterclockwise as viewed from the distal end of the second tooth 6b. In other words, the direction in which the wire 25 is wound around the first tooth 6b is the same as the direction in which the wire 25 is wound around the second tooth 6b.

When the second coil U3 is completely formed, the rotation of the drive shaft 33 is stopped. The part of the wire 25 that extends from the winding end position of the second coil U3 is engaged with the engagement groove 21e of the second divisional core 62 and cut to a predetermined length to form a lead wire 25a.

Next, the auxiliary shaft 35 is moved away from the drive shaft 33 to remove the first divisional core 61 and the second divisional core 62 from the winding machine 31. This completes a divisional unit 51. The divisional unit 51 includes the first divisional core 61, the second divisional core 62, the first coil U1, the second coil U3, and the connection wire Ua.

As shown in FIG. 7, the first coil U1 and the second coil U3 in the divisional unit 51 are both wound in the counterclockwise direction as viewed from the distal ends of the corresponding teeth 6b.

Figure 8:
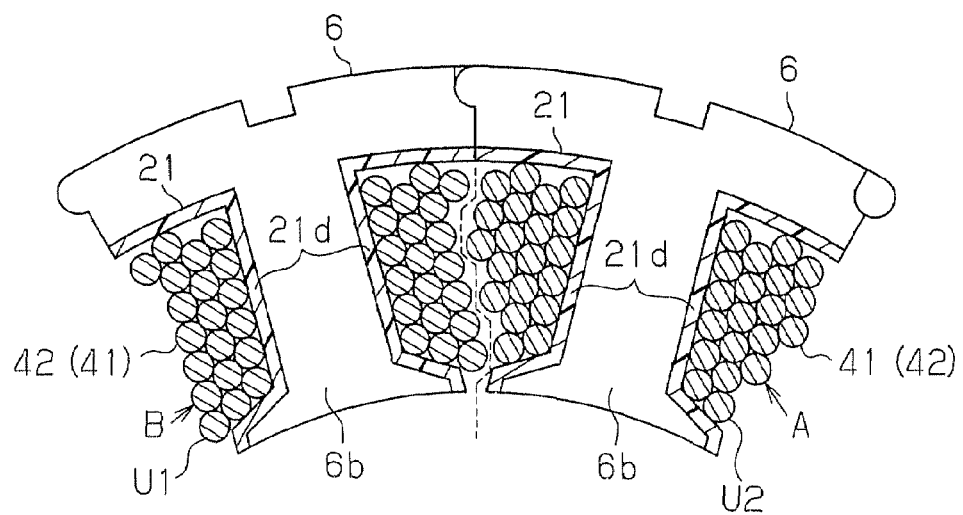
FIG. 8 is a cross-sectional view of adjacent two coils shown in FIG. 1A.
Figure 9:
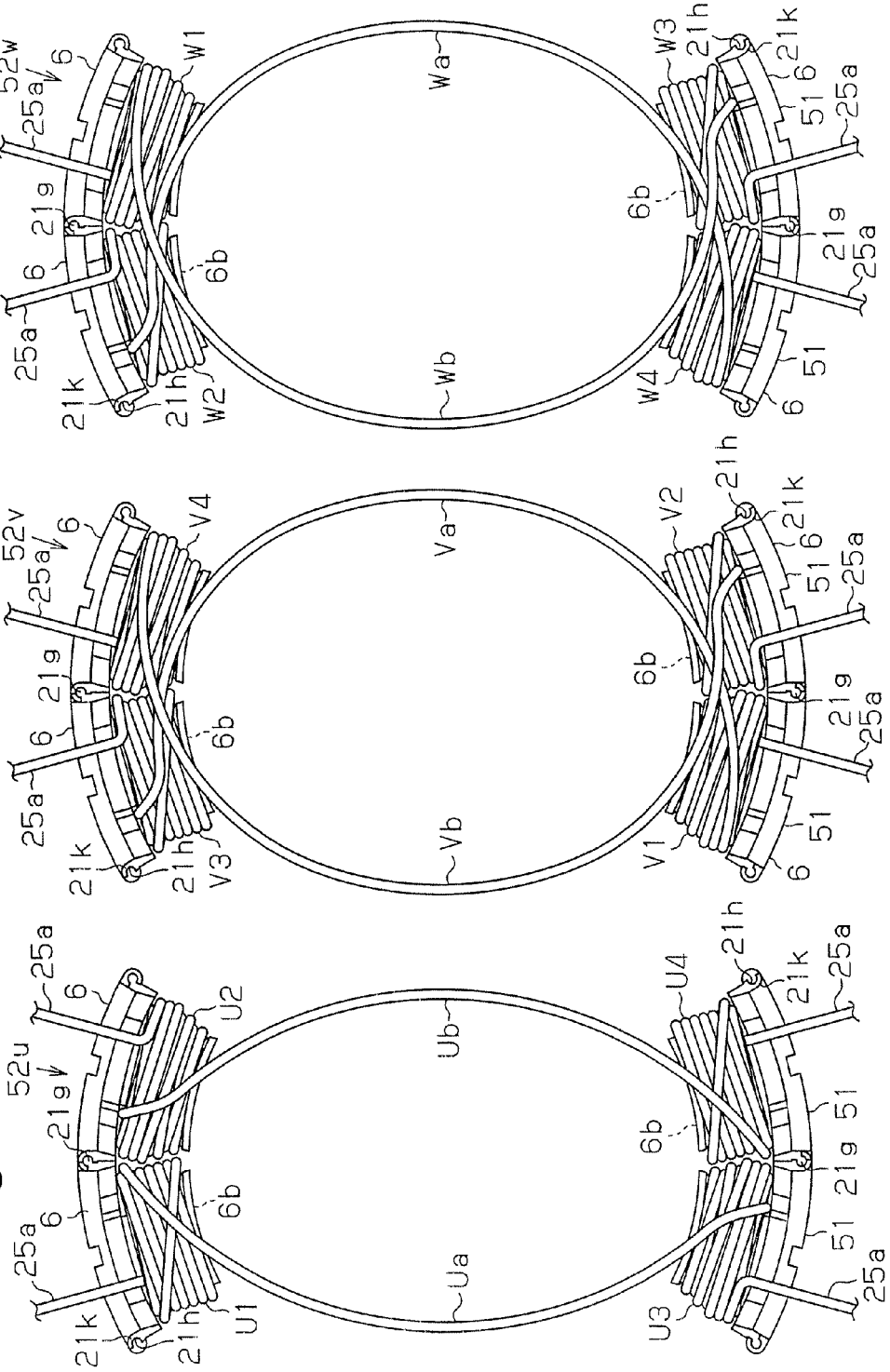
FIGS. 9A to 9C are plan views of first to third phase assemblies shown in FIG. 1A.

As shown in FIG. 8, the coil U1 is formed by winding the wire 25 in a layout pattern B. The coil U2 is formed by winding the wire 25 in a layout pattern A. As indicated by the broken line in FIG. 8, the layout patterns A and B are set in a manner that the ridges and valleys of the coils U1 and U2 that are adjacent to each other in the circumferential direction are engaged with each other. In other words, the layout patterns A and B of the coils U1 and U2 that are adjacent to each other in the circumferential direction differ from each other. The layout patterns A and B of the coils U1 to W4 are alternated when viewed in the circumferential direction. The first coil is not limited to the coil U1, and the second coil is not limited to the coil U3. The first coil may be the coil U3, and the second coil may be the coil U1.

The winding process is repeated six times to form six divisional units 51. More specifically, a first divisional unit 51 and a second divisional unit 51 are formed for the U-phase. The first divisional unit 51 includes the coils U1 and U3, the connection wire Ua, and two divisional cores 6. The second divisional unit 51 includes the coils U2 and U4, the connection wire Ub, and two divisional cores 6.

Further, a third divisional unit 51 and a fourth divisional unit 51 are formed for the V-phase. The third divisional unit 51 includes the coils V1 and V3, the connection wire Va, and two divisional cores 6. The fourth divisional unit 51 includes the coils V2 and V4, the connection wire Vb, and two divisional cores 6.

Further, a fifth divisional unit 51 and a sixth divisional unit 51 are formed for the W-phase. The fifth divisional unit 51 includes the coils W1 and W3, the connection wire Wa, and two divisional cores 6. The sixth divisional unit 51 includes the coils W2 and W4, the connection wire Wb, and two divisional cores 6.

In the assembling process, the six divisional units 51 are assembled together. The assembling process includes a first assembling process for forming three phase assemblies and a second assembling process for assembling the three phase assemblies into an annular arrangement. The three phase assemblies include a U-phase assembly 52u for the U-phase, a V-phase assembly 52v for the V-phase, and a W-phase assembly 52w for the W-phase.

FIG. 9A shows the U-phase assembly 52u that is formed in the first assembling process. The U-phase assembly 52u includes the first divisional unit 51 and the second divisional unit 51. More specifically, the U-phase assembly 52u includes the coils U1, U2, U3, and U4, the connection wires Ua and Ub, and the four divisional cores 6. The connection wires Ua and Ub do not intersect with each other.

The divisional core 6 having the coil U1 is adjacent to the divisional core 6 having the coil U2 in the circumferential direction. The divisional core 6 having the coil U3 is adjacent to the divisional core 6 having the coil U4 in the circumferential direction. A first end of the connection wire Ua and a first end of the connection wire Ub are arranged between the lead wire 25a of the coil U1 and the lead wire 25a of the coil U2. A second end of the connection wire Ua and a second end of the connection wire Ub are arranged between the lead wire 25a of the coil U3 and the lead wire 25a of the coil U4.

The corresponding round recess 12e and round projection 12d are engaged with each other and the corresponding connecting projection 21g and the corresponding accommodating portion 21k are engaged with each other so that the divisional core 6 having the coil U1 is pivotally connected to the divisional core 6 having the coil U2. Likewise, the divisional core 6 having the coil U3 is pivotally connected to the divisional core 6 having the coil U4.

FIG. 9B shows the V-phase assembly 52v including the third divisional unit 51 and the fourth divisional unit 51. The V-phase assembly 52v includes the coils V1, V2, V3, and V4, the connection wires Va and Vb, and the four divisional cores 6. The divisional core 6 having the coil V1 is adjacent to the divisional core 6 having the coil V2 in the circumferential direction. The divisional core 6 having the coil V3 is adjacent to the divisional core 6 having the coil V4 in the circumferential direction.

The connection wires Va and Vb intersect with each other. The lead wire 25a of the coil V1 and the lead wire 25a of the coil V2 are arranged between a first end of the connection wire Va and a first end of the connection wire Vb. The lead wire 25a of the coil V3 and the lead wire 25a of the coil V4 are arranged between a second end of the connection wire Va and a second end of the connection wire Vb. The V-phase assembly 52v differs from the U-phase assembly 52u in this point.

The corresponding round recess 12e and round projection 12d are engaged with each other and the corresponding connecting projection 21g and the corresponding accommodating portion 21k are engaged with each other so that the divisional core 6 having the coil V1 is pivotally connected to the divisional core 6 having the coil V2. Likewise, the divisional core 6 having the coil V3 is pivotally connected to the divisional core 6 having the coil V4.

FIG. 9C shows the W-phase assembly 52w including the fifth divisional unit 51 and the sixth divisional unit 51. The W-phase assembly 52w has the same structure as the V-phase assembly 52v.

The W-phase assembly 52w includes the coils W1, W2, W3, and W4, the connection wires Wa and Wb, and the four divisional cores 6. The divisional core 6 having the coil W1 is adjacent to the divisional core 6 having the coil W2 in the circumferential direction. The divisional core 6 having the coil W3 is adjacent to the divisional core 6 having the coil W4 in the circumferential direction.

The connection wires Wa and Wb intersect with each other. The lead wire 25a of the coil W1 and the lead wire 25a of the coil W2 are arranged between a first end of the connection wire Wa and a first end of the connection wire Wb. The lead wire 25a of the coil W3 and the lead wire 25a of the coil W4 are arranged between a second end of the connection wire Wa and a second end of the connection wire Wb.

The corresponding round recess 12e and round projection 12d are engaged with each other and the corresponding connecting projection 21g and the corresponding accommodating portion 21k are engaged with each other so that the divisional core 6 having the coil W1 is pivotally connected to the divisional core 6 having the coil W2. Likewise, the divisional core 6 having the coil W3 is pivotally connected to the divisional core 6 having the coil W4.

In any of the U-phase assembly 52u, the V-phase assembly 52v, and the W-phase assembly 52w, the layout patterns A and B of the coils U1 to W4 that are adjacent in the circumferential direction are engaged with each other.

Figure 10:
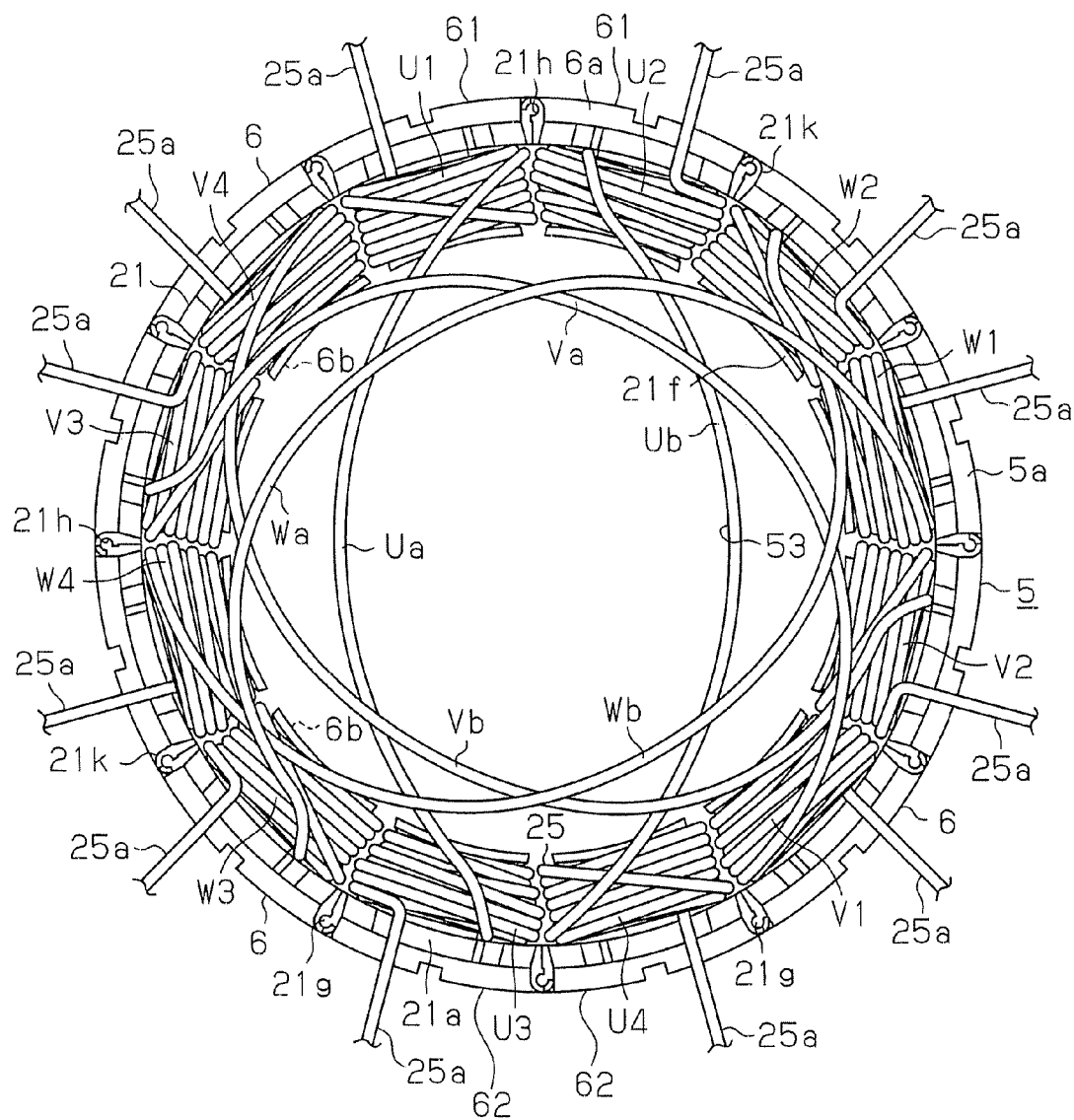
FIG. 10 is a plan view showing an assembled state of the first to third phase assemblies shown in FIG. 9A to 9C.
Figure 11:
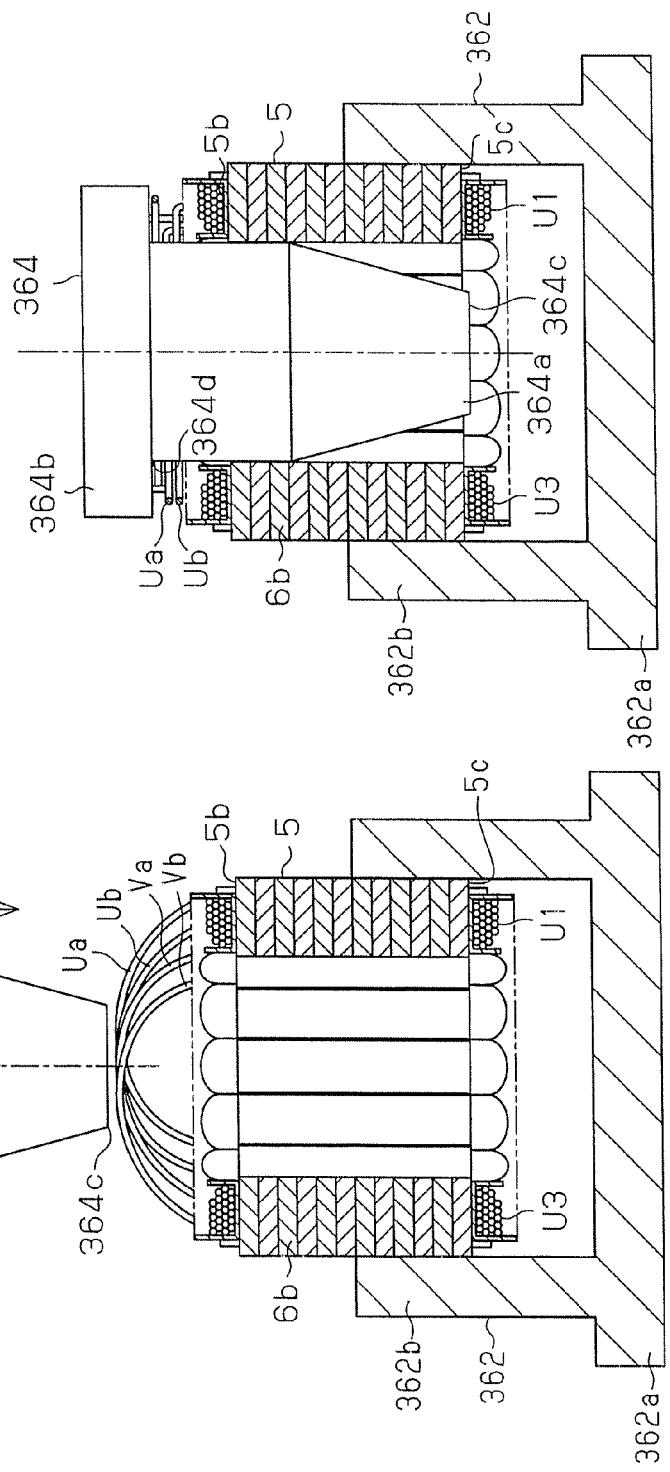
FIG. 11A is a side view of an apparatus for shaping a plurality of connection wires shown in FIG. 10.
FIG. 11B is a side view showing a plurality of connection wires that have been shaped together by the apparatus of FIG. 11A.

The U-phase assembly 52u, the V-phase assembly 52v, and the W-phase assembly 52w shown in FIGS. 9A to 9C are assembled as shown in FIG. 10 in the second assembling process. FIG. 10 shows the twelve divisional cores 6 in an annular arrangement.

First, the U-phase assembly 52u is integrated with the V-phase assembly 52v. As shown in FIG. 10, the divisional core 6 having the coil U1 is adjacent to the divisional core 6 having the coil V4 in the circumferential direction. The divisional core 6 having the coil U4 is adjacent to the divisional core 6 having the coil V1. To connect the divisional cores 6 that are adjacent to each other in the circumferential direction, the corresponding round projection 11d and round recess 11e are fitted together, the corresponding round projection 12d and round recess 12e are fitted together, and the corresponding connecting projection 21g and accommodating portion 21k are engaged with each other. As a result, the adjacent insulators 21 are pivotally connected to each other. The divisional cores 6 that are adjacent to each other in the circumferential direction are also pivotally connected to each other.

The W-phase assembly 52w is assembled with the U-phase assembly 52u and the V-phase assembly 52v that have been assembled together. As shown in FIG. 10, the divisional core 6 having the coil W1 and the divisional core 6 having the coil W2 are arranged between the divisional core 6 having the coil U2 and the divisional core 6 having the coil V2. The divisional core 6 having the coil W3 and the divisional core 6 having the coil W4 are arranged between the divisional core 6 having the coil U3 and the divisional core 6 having the coil V3.

In the U-phase assembly 52u, the two divisional cores 6 arranged at the first ends of the two connection wires Ua and Ub face the two divisional cores 6 arranged at the second ends of the connection wires Ua and Ub in the radial direction of the stator core 5. The same applies to the V-phase connection wires Va and Vb and the W-phase connection wires Wa and Wb. The connection wires Ua to Wb project from the first end surface 5b of the stator core 5.

As shown in FIG. 10, each of the connection wires Ua to Wb are curved to be arcuate. In detail, each of the connection wires Ua and Ub is formed to be arcuate and slightly curved in a radially outward direction so that the connection wires Ua and Ub become farther from each other. Each of the connection wires Va and Vb is also arcuate and curved in a radially outward direction. The connection wires Va and Vb intersect with each other. Further, each of the connection wires Wa and Wb is also arcuate and curved in a radially outward direction. The connection wires Wa and Wb intersect with each other.

As a result, the twelve arcuate portions 6a form the annular portion 5a of the stator core 5. The teeth 6b extend radially inward from the annular portion 5a.

The connecting projections 21g are connected to the accommodating portions 21k. This prevents the divisional cores 6 from being separated from one another in the subsequent processes.

As shown in FIG. 10, the connection wires Ua to Wb that have passed through the second assembling process define a shaping hole 53 in a central portion of the stator core 5. As shown in FIG. 8, the coils U1 and U2 are arranged in a manner that the ridges and valleys of the layout pattern B of the coil U1 are engaged with the ridges and valleys of the layout pattern A of the coil U2.

Next, the shaping process of the connection wires Ua to Wb is performed. A shaping apparatus 361 shown in FIG. 11A shapes the connection wires Ua to Wb.

As shown in FIG. 11A, the shaping apparatus 361 includes a fixed base 362, a shaping tool 364 that is movable relative to the fixed base 362, and a drive device 363 for driving the shaping tool 364. The fixed base 362 positions the twelve divisional cores 6 that are in an annular arrangement in a manner that their teeth 6b are oriented in an inward direction.

The fixed base 362 includes a fixed plate 362a and a fixed cylinder 362b. The fixed cylinder 362b is cylindrical and projects from the fixed plate 362a. The fixed cylinder 362b is formed integrally with the fixed plate 352a. The fixed plate 362a is arranged horizontally. The inner diameter of the fixed cylinder 362b is equal to the outer diameter of the stator core 5.

The shaping tool 364 has an annular shaping flange 364b and a cylindrical insertion portion 364a. The insertion portion 364a extends from the shaping flange 364b. The insertion portion 364a, which serves as an insertion shaping portion, is formed integrally with the shaping flange 364b. The center axis of the insertion portion 364a coincides with the center axis of the fixed cylinder 362b. The outer diameter of the insertion portion 364a is equal to or slightly smaller than the inner diameter of the stator core 5. The insertion portion 364a has the shape of a truncated cone. More specifically, the diameter of the insertion portion 364a increases gradually from its distal end 364c to its basal end 364d. The basal end 364d is adjacent to the shaping flange 364b. The diameter of the distal end 364c of the insertion portion 364a is set to permit insertion of the distal end 364c into the shaping hole 53.

The outer diameter of the shaping flange 364b is greater than the inner diameter of the annular portion 5a. The outer diameter of the shaping flange 364b is slightly smaller than the outer diameter of the stator core 5. The center axis of the shaping flange 364b coincides with the center axis of the insertion portion 364a.

The shaping tool 364 is moved along the center axis of the shaping tool 364 by the drive device 363. The shaping tool 364 reciprocates between a standby position spaced from the fixed plate 362a as shown in FIG. 11A and a shaping position located near the fixed plate 362a as shown in FIG. 11B. The distal end 364c of the shaping tool 364 at the standby position is located outside the opening of the fixed cylinder 362b. The distal end 364c of the shaping tool 364 at the shaping position is located inside the fixed cylinder 362b.

To shape the connection wires Ua to Wb, the shaping tool 364 is first arranged at the standby position as shown in FIG. 11A. The twelve divisional cores 6 are set inside the fixed cylinder 362b. As a result, the fixed cylinder 362b is held in a manner that the divisional cores 6 are not movable in the axial direction and the circumferential direction. The connection wires Ua to Wb are face toward the shaping tool 364. The center axis of the twelve divisional cores 6 that are in an annular arrangement coincides with the center axis of the fixed cylinder 362b.

Figure 12:
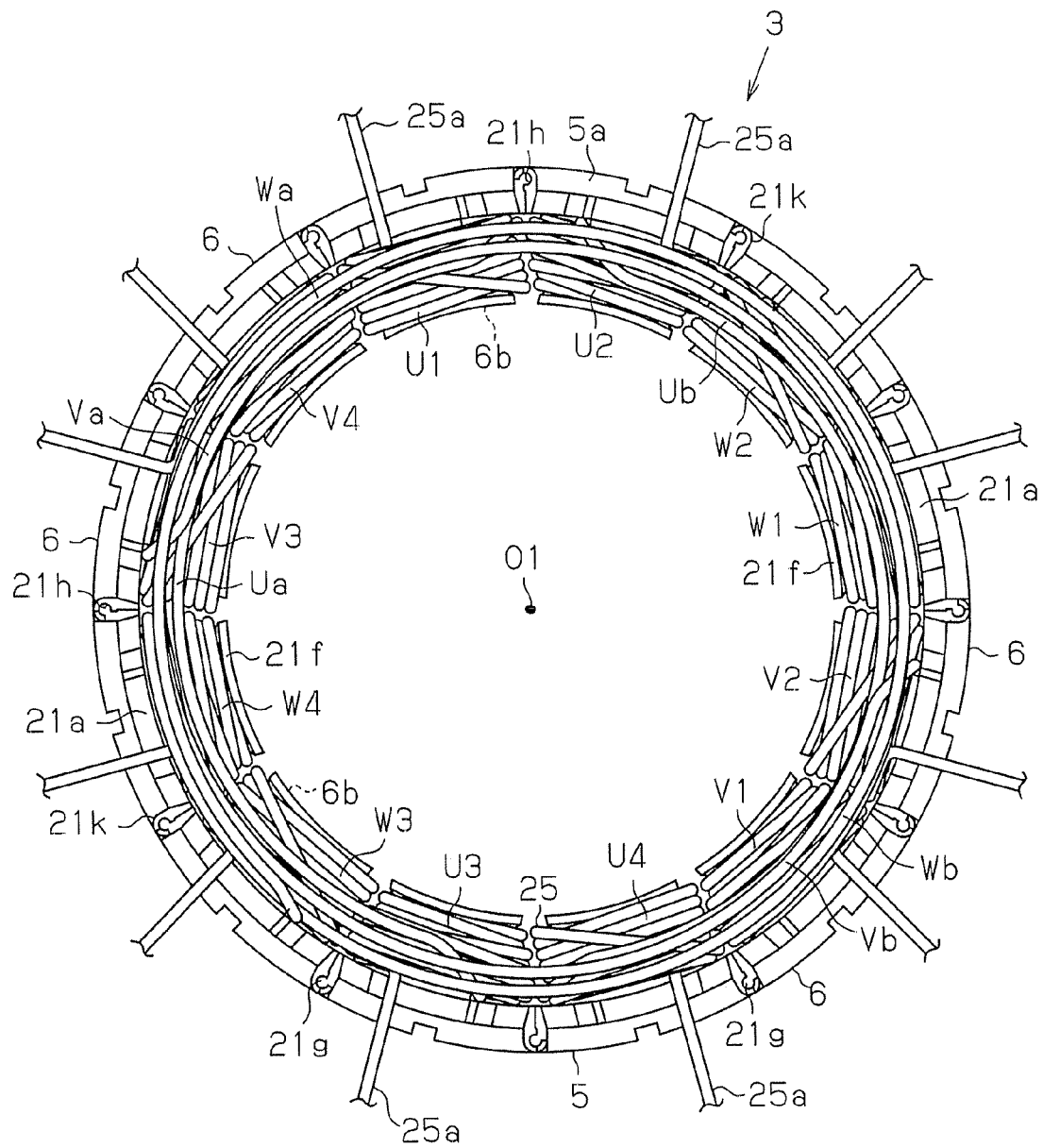
FIG. 12 is a plan view of a stator in which the connection wires have been shaped.

As shown in FIG. 11B, the shaping tool 364 is next moved to the shaping position. The diameter of the shaping hole 53 increases as the insertion portion 364a enters the shaping hole 53. More specifically, the insertion portion 364a moves the connection wires Ua to Wb radially outward as the insertion portion 364a enters the shaping hole 53. As a result, the connection wires Ua to Wb are moved radially outward until the diameter of the shaping hole 53 becomes equal to the inner diameter of the stator core 5 as shown in FIG. 12.

As shown in FIG. 11B and FIG. 13, the shaping flange 364b moves the connection wires Ua to Wb toward the coils U1 to W4 as the shaping flange 364b moves from the standby position to the shaping position. The connection wires Ua to Wb are held between the shaping flange 364b and the coils U1 to W4 at the shaping position. As a result, the connection wires Ua to Wb each extend in an arcuate manner about the center axis O1. The connection wires Ua to Wb are arranged between the outer wall 21a and the inner wall 21f. This completes the stator 3. After the insertion portion 364a is moved from the shaping position to the standby position, the stator 3 is removed from the fixed cylinder 362b.

The first embodiment has the advantages described below.

(1) In the stator core 5 shown in FIG. 10, the teeth 6b that are not adjacent to each other in the circumferential direction are arranged adjacent to each other in the wire winding process shown in FIG. 6B. Thus, the distance between two divisional cores 6 in the wire winding process is not restricted by divisional cores 6 for different connection wires Ua to Wb. As a result, the distance between the two divisional cores 6 in the wire winding process is adjustable. This shortens the connection wires Ua to Wb.

In the wire winding process, the distance between the plurality of divisional cores 6 is not restricted by the dimensions of the film insulators in the circumferential direction. The present invention differs from the prior art in this point. Accordingly, the space provided for winding the coils U1 to W4 around the teeth 6b can be enlarged. This prevents each divisional core 6 from interfering with winding of the coils U1 to W4 on other divisional cores 6. As a result, the coils U1 to W4 are wound on the divisional cores 6 more easily. Further, the winding speed of the wire 25 may be increased.

With the first winding method and the second winding method of the prior art, the plurality of divisional cores are adjacent to each other in the same arrangement as in the assembled state of the stator core 5 when the coils are wound. However, the divisional cores are arranged in an arrangement differing from the arrangement in the assembled state of the stator core 5. This shortens the connection wires Ua to Wb.

(2) In the second assembling process, the connection wires Ua to Wb each extend in an arcuate manner and curve radially outward. As a result, the connection wires Ua to Wb are located near the first end surface 5b of the stator core 5. This further facilitates the connecting wire shaping process performed after the second assembling process.

(3) In the connecting-wire shaping process, the insertion of the shaping tool 364 into the central portion of the stator core 5 moves the connection wires Ua to Wb radially outward. More specifically, the connection wires Ua to Wb are converged at the first end surface 5b of the stator core 5. This further facilitates the shaping of the connection wires Ua to Wb.

(4) The six divisional units 51 are formed in the wire winding process. Each divisional unit 51 includes one of the connection wire Ua to Wb and two of the coils U1 to W4 of the same phase that are connected by the connection wire Ua. This prevents the connection wires Ua to Wb from being entangled with the connection wires Ua to Wb of other phases in the wire winding process. As a result, the wire winding process is performed further smoothly.

In the assembling process, the six divisional units 51 are assembled together to form the stator core 5. Unlike the first winding method and the second winding method of the prior art, the connection wires Ua to Wb are rarely entangled with one another. In other words, the assembling process is performed smoothly.

(5) As shown in FIG. 6B, the connection wire Ua is formed to have a length so that it extends from the first coil U1 to the second coil U3 in the circumferential direction in the assembled state of the stator core 5 during the wire winding process. The connection wires Ua to Wb are each formed to have such a length. In this manner, the divisional units 51 are all formed through the same wire winding process. This eliminates the need for changing the coil winding method in accordance with each divisional unit 51. This prevents the formation process of the divisional units 51 from becoming complicated.

(6) In the second assembling process shown in FIG. 10, the first divisional unit 51 and the second divisional unit 51 of the U-phase are adjacent to each other in the circumferential direction. Further, the two divisional cores 6 arranged at the first ends of the connection wires Ua and Ub radially face the two divisional cores 6 arranged at the second ends of the connection wires Ua and Ub. The same applies to the V-phase and the W-phase. Accordingly, the six connection wires Ua to Wb are prevented from being distributed in a concentrated manner at one part of the stator core 5. As a result, the stator 3 in which the connection wires Ua to Wb have been shaped is further reduced in size in the axial direction.

In each of the U-phase assembly 52u, the V-phase assembly 52v, and the W-phase assembly 52w, the two divisional cores 6 arranged at the first ends of the two connection wires Ua and Ub radially face the two divisional cores 6 arranged at the second ends of the connection wires Ua and Ub. Each of the connection wires Ua to Wb extend in an arcuate manner and curve radially outward. As a result, the connection wires Ua to Wb define the shaping hole 53 in the central portion of the stator core 5. Thus, in the connecting wire shaping process, the insertion of the shaping tool 364 into the shaping hole 53 facilitates the shaping of the connection wires Ua to Wb. This prevents the connection wires Ua to Wb from being distributed in a concentrated manner at one part of the stator core 5. As a result, the stator 3 is further reduced in size in the axial direction.

(7) In the wire winding process, the connection wire Ua is formed to extend along the hypothetical circle C1 between the outer wall 21a and the inner wall 21f. Accordingly, in the connecting-wire shaping process performed after the wire winding process, the connection wire Ua is easily shaped to converge at the first end surface 5b of the stator core 5.

(8) In the assembling process, the divisional cores 6 that are adjacent to each other in the circumferential direction are pivotally connected to each other by engagement between the connecting projection 21g and the accommodating portion 21k. This prevents the twelve divisional cores 6 from radially moving in the connecting-wire shaping process performed after the assembling process of the stator core 5. As a result, the connecting-wire shaping process is performed further smoothly.

(9) As shown in FIG. 8, the coils wound with the layout pattern A and the coils wound with the layout pattern B are arranged alternately in the circumferential direction of the stator core 5. This reduces wasted space in each slot 13 as compared with when, for example, all the coils are wound with the same layout pattern. As a result, the lamination factor of the coils of the stator 3 increases.

A second embodiment of the present invention will now be described with reference to FIGS. 14 to 18. The components of the second embodiment that are the same as the components of the first embodiment are given the same reference numerals as those components and will not be described.

Figure 15:
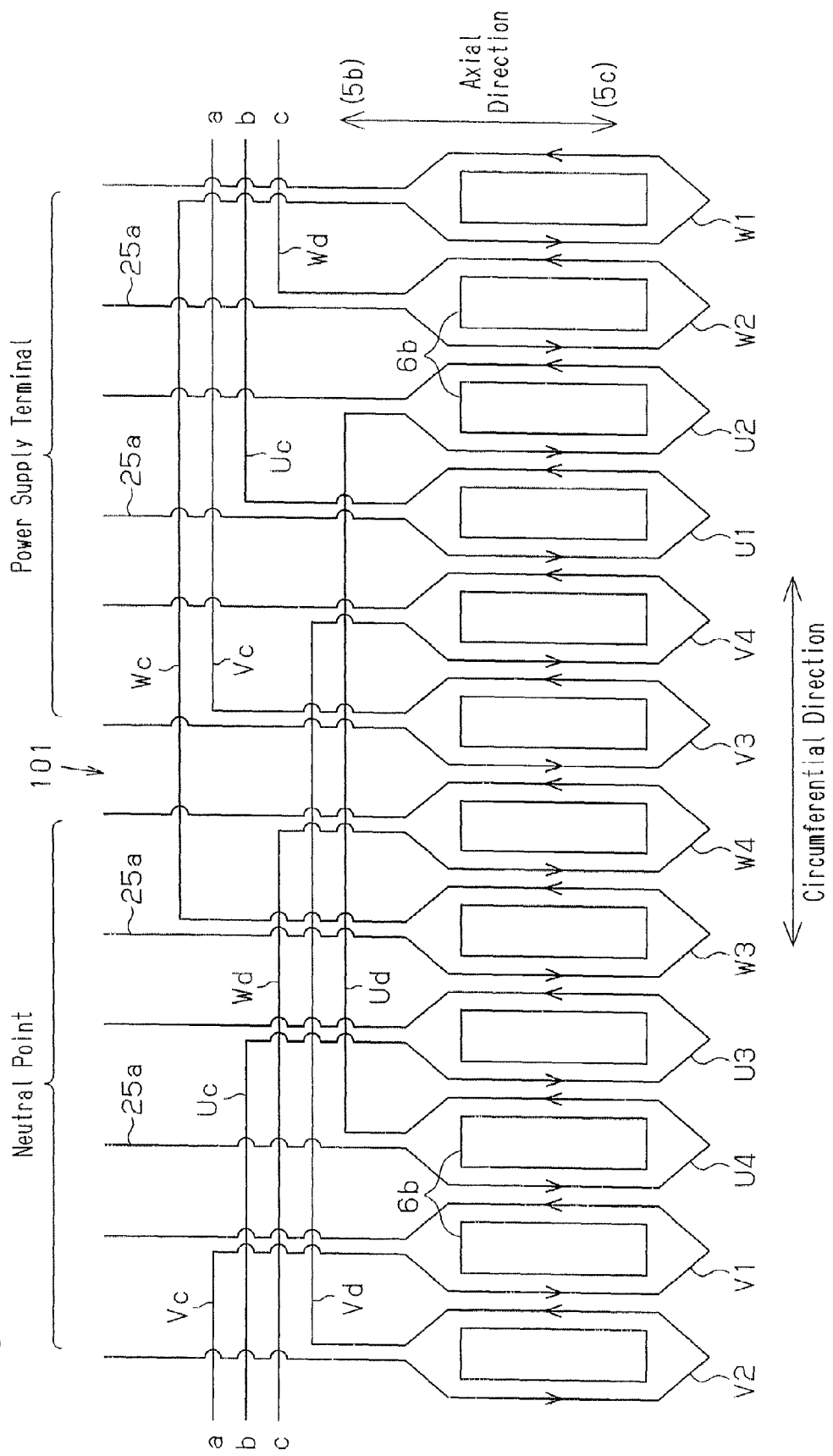
FIG. 15 is a development view of a plurality of coils and a plurality of connection wires shown in FIG. 14.

As shown in FIG. 15, a wire 25 is wound counterclockwise as viewed from distal ends of teeth 6b to form coils U1 to W4 in the second embodiment in the same manner as in the first embodiment.

A stator 101 of the second embodiment includes connection wires Uc, Ud, Vc, Vd, Wc, and Wd in lieu of the connection wires Ua, Ub, Va, Vb, Wa, and Wb. Each of the connection wires Uc to Wd crosses six coils U1 to W4. The eleventh connection wire Uc crosses the coils U4, V1, V2, W1, W3, and U2 to extend from the coil U3 to the coil U1. The twelfth connection wire Ud crosses the coils U1, V4, V3, W4, W3, and U3 to extend from the coil U2 to the coil U4.

The thirteenth connection wire Vc crosses the coils V2, W1, W2, U2, U1, and V4 to extend from the coil V1 to the coil V3. The fourteenth connection wire Vd crosses the coils V3, W4, W3, U3, U4, and V1 to extend from the coil V4 to the coil V2.

The fifteenth connection wire Wc crosses the coils W2, U2, U1, V4, V3, and W4 to extend from the coil W1 to the coil W3. The sixteenth connection wire Wd crosses the coils W3, U3, U4, V1, V2, and W1 to extend from the coil W4 to the coil W2.

The connection wires Uc to Wd and lead wires 25a are arranged on a second end surface 5c of a stator core 5.

Figure 14:
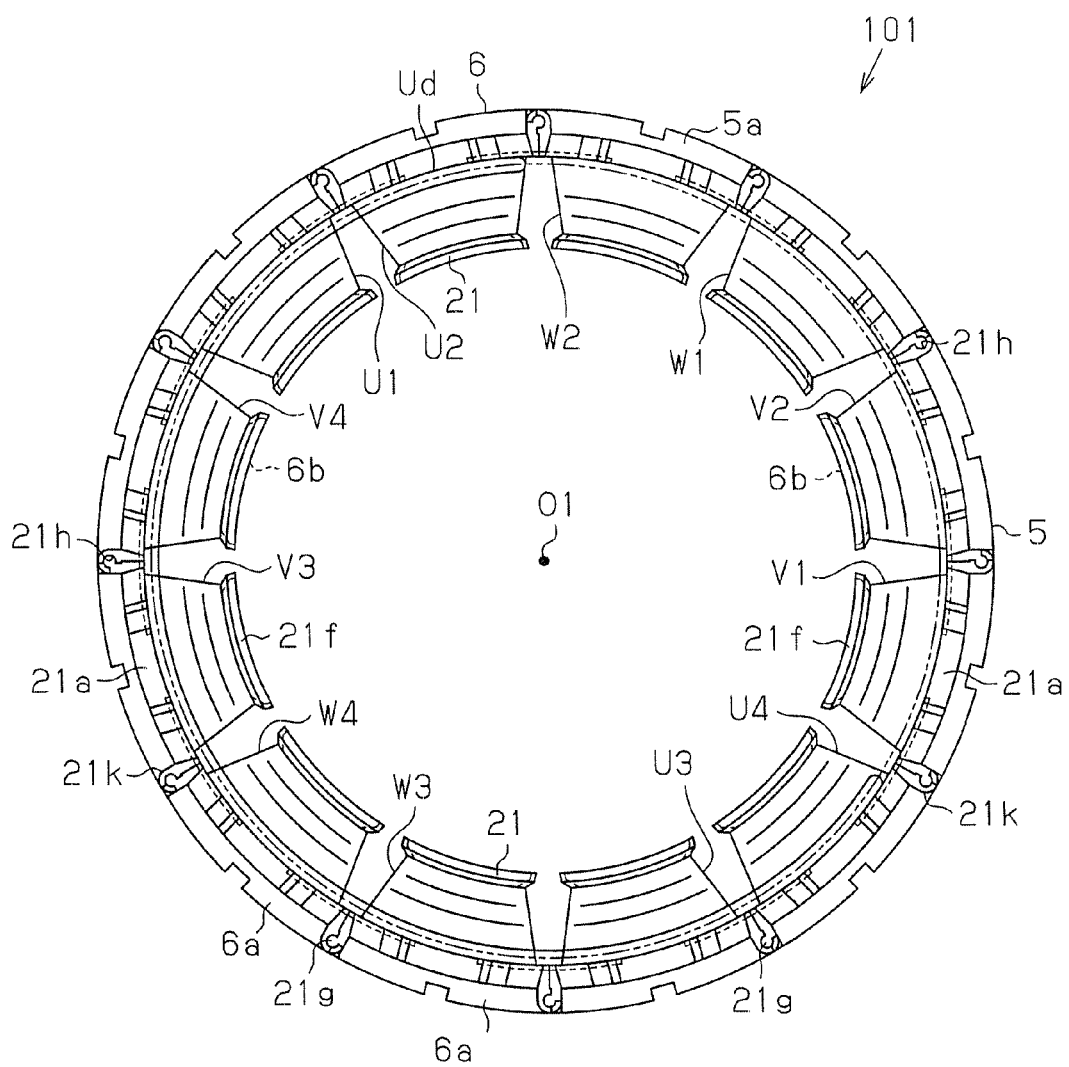
FIG. 14 is a plan view of a stator according to a second embodiment of the present invention.

As shown in FIG. 14, each of the connection wires Uc to Wd extend in an arcuate manner along a hypothetical circle C1. In other words, the connection wires Uc to Wd are arranged between an outer wall 21a and an inner wall 21f. FIG. 14 shows only the connection wire Ud.

A method for manufacturing the stator 101 of the second embodiment also includes a divisional-core formation process, a wire winding process, an assembling process, and a connecting-wire shaping process. The assembling process and the wire winding process are performed simultaneously.

Figure 16:
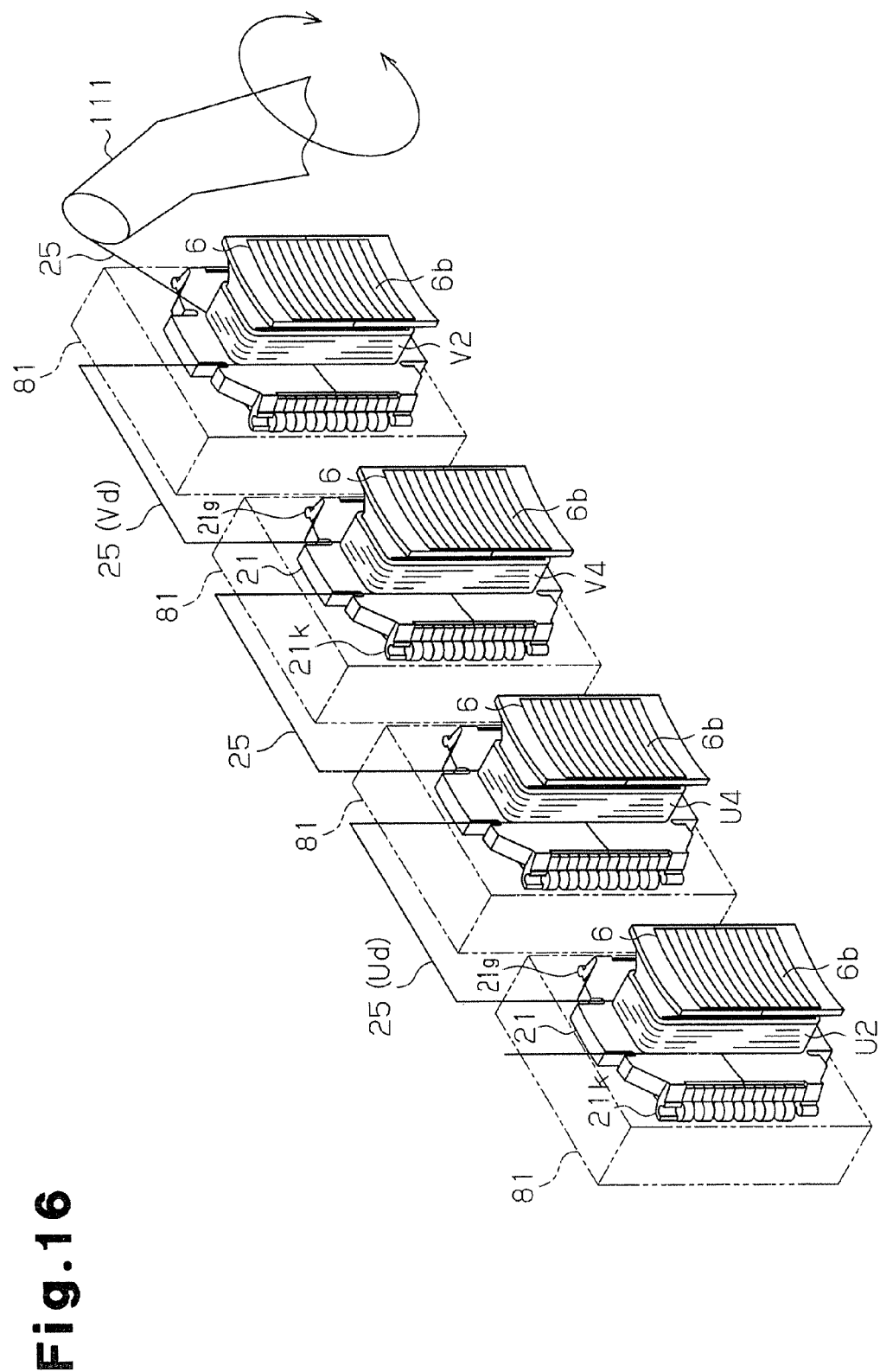
FIG. 16 is a perspective view showing a process for winding a wire around a plurality of teeth shown in FIG. 14.

As shown in FIG. 16, a flyer 111 winds the wire 25 around the teeth 6b in the wire winding process. The flyer 111 winds the wire 25 sequentially around the teeth 6b at of 210 degree interval in the counterclockwise direction of the stator 101. For example, the flyer 111 winds the wire 25 to form the coils U2, U4, V4, V2, W4, W2, U3, U1, V1, V3, W1, and W3 in the stated order. More specifically, in the second embodiment, the coil U2 is a firstly-wound coil that is formed first. The coil W3 is a lastly-wound coil that is formed last. A divisional core 6b around which the coil U2 has been wound is referred to as a firstly-wound core 6b, and a divisional core 6b around which the coil W3 has been wound is referred to as a lastly-wound core 6b.

As shown in FIG. 16, each of a plurality of holders 81 holds a single divisional core 6. The holders 81 hold the divisional cores 6 in a manner that their teeth 6b extend parallel to one another. More specifically, the holders 81 align the divisional cores 6 along a straight line that is orthogonal to the teeth 6b. Each holder 81 has the above-described first engagement projection 34b. The first engagement projection 34b is engaged with an engagement groove 6d of the corresponding tooth 6b. Each holder 81 holds an arcuate portion 6a of the corresponding divisional core 6 from two sides in the axial direction.

A divisional core 6 around which the wire 25 is first wound is referred to as a first divisional core 61, and a divisional core 6 around which the wire 25 is wound next is referred to as a second divisional core 62. In a state in which the first divisional core 61 and the second divisional core 62 are held by the holders 81, the first divisional core 61 and the second divisional core 62 are not connected to each other. More specifically, the first divisional core 61 and the second divisional core 62 are not connected by engagement between the connecting projection 21g and the accommodating portion 21k. In a state in which the first divisional core 61 and the second divisional core 62 are held by the holders 81, no other divisional cores 6 are arranged between the first divisional core 61 and the second divisional core 62. In other words, in a state in which the first divisional core 61 and the second divisional core 62 are held by the holders 81, the first divisional core 61 and the second divisional core 62 are adjacent to each other.

The distance between the first divisional core 61 and the second divisional core 62 is set equal to the distance between the first divisional core 61 and the second divisional core 62 in the circumferential direction in the assembled state of the stator 5. More specifically, the distance between the first divisional core 61 and the second divisional core 62 is set equal to the distance corresponding to 210 degrees in the circumferential direction in the assembled state of the stator 101.

Formation of the coil U2 on the first divisional core 61 and the coil U4 on the second divisional core 62 will now be described. In a state in which the holder 81 is holding the first divisional core 61, the flyer 111 forms the coil U2 by winding the wire 25 around the first tooth 6b. To form the coil U2, the wire 25 is wound counterclockwise as viewed from the distal end of the tooth 6b. The flyer 111 rotates counterclockwise.

Next, without the wire 25 being cut, the first divisional core 61 and the second divisional core 62 are moved in a direction perpendicular to the direction in which the teeth 6b extend. As a result, the second divisional core 62 approaches the flyer 111. The divisional core 6 facing the flyer 111 and the divisional core 6 around which the wire 25 is to be wound next are arranged at an interval equal to the distance between the two divisional cores 6 in the circumferential direction in the annular arrangement of the divisional cores 6 having their teeth 6b oriented in a radially inward direction. More specifically, the divisional core 6 facing the flyer 111 and the divisional core 6 around which the wire 25 is to be wound next are arranged at an interval equal to the distance corresponding to 210 degrees in the circumferential direction in the assembled state of the stator 101.

The flyer 111 forms the coil U4 by winding the wire 25 around the second tooth 6b. The flyer 111 winds the wire 25 counterclockwise as viewed from the distal end of the tooth 6b. In other words, the flyer 111 rotates counterclockwise.

The length of a portion of the wire 25 between the coil U2 and the coil U4 is adjusted to function as the connection wire Ud.

Thereafter, the movement of the divisional cores 6 using the holders 81 and the winding of the wire 25 using the flyer 111 are repeated in the same manner so that the coils U4, V4, V2, W4, W2, U3, U1, V1, V3, W1, and W3 are sequentially formed. More specifically, the adjacent divisional cores 6 in the wire winding process performed using the flyer 111 are not adjacent to each other in the circumferential direction in the assembled state of the stator 101.

The wire 25 is not cut until all the twelve coils U1 to W4 are formed. After the last coil W3 is formed, the wire 25 extending from the flyer 111 is cut. With this method, the single wire 25 connects all the coils U1 to W4.

The assembling process of the second embodiment will now be described.

Figure 17:
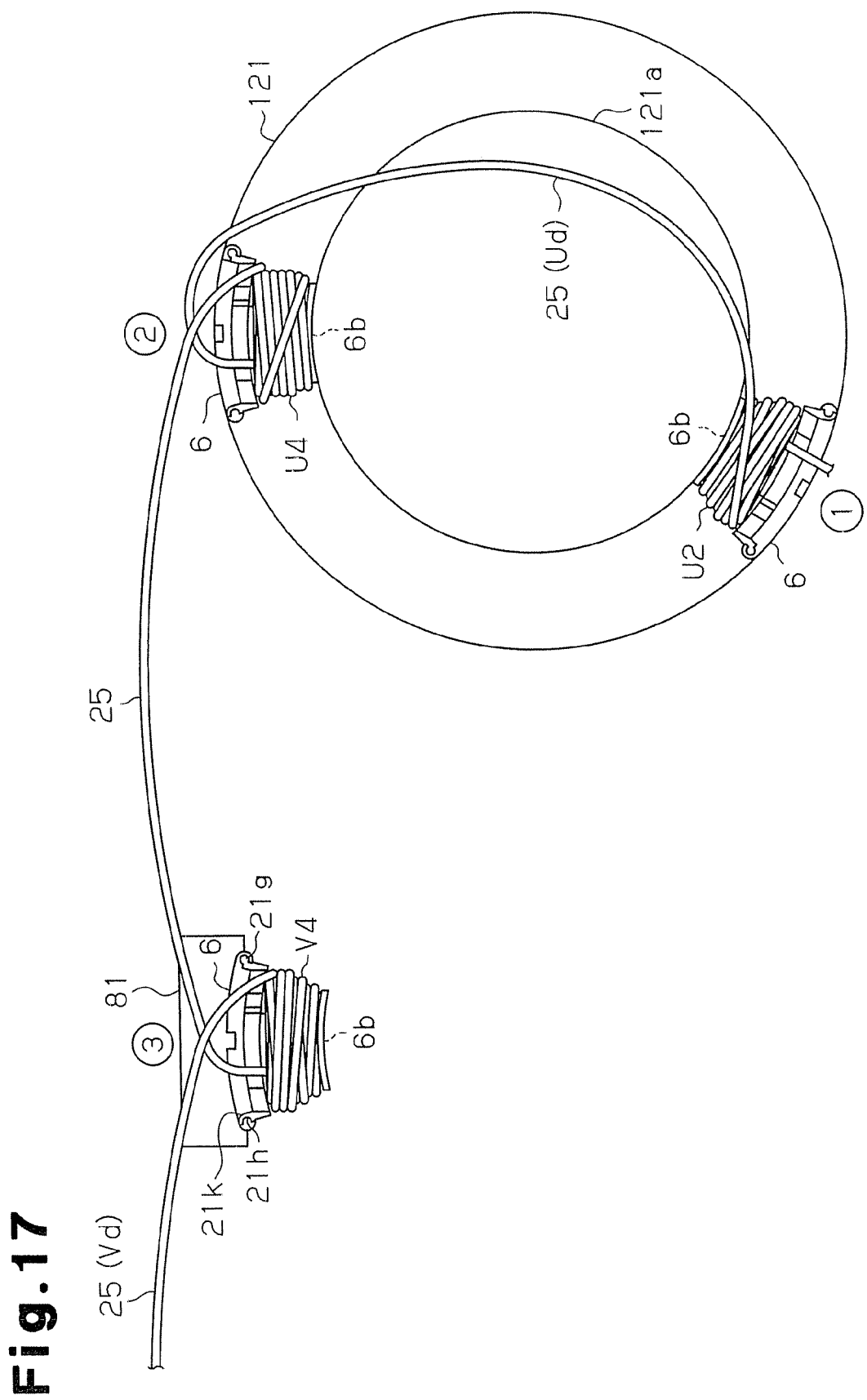
FIG. 17 is a plan view showing a process for arranging a plurality of divisional cores shown in FIG. 16 on a turntable.
Figure 18:
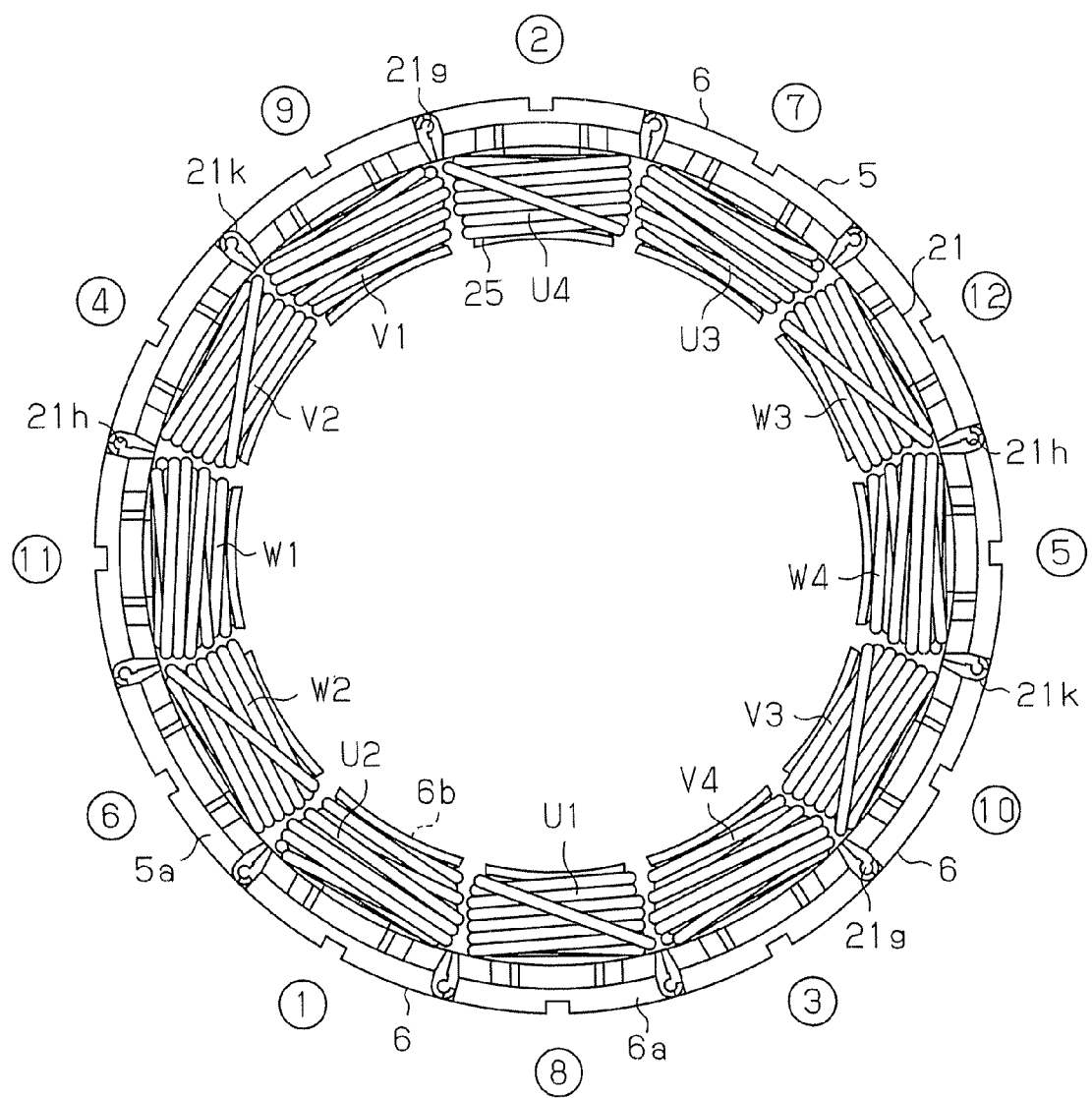
FIG. 18 is a plan view showing an assembled state of the plurality of divisional cores shown in FIG. 17.

As shown in FIG. 17, a cylindrical turntable 121 is arranged apart from the flyer 111. The holders 81 move the divisional cores 6 having the corresponding coils U1 to W4 to the turntable 121. The divisional cores 6 are assembled together on the turntable 121. It is preferred that the distance between the flyer 111 and the turntable 121 is an integral multiple of the length of the connection wires Uc to Wd.

The outer diameter of the turntable 121 is equal to the outer diameter of the stator 101. A cylindrical guide portion 121a is formed integrally with the turntable 121 on the central portion of the upper surface. An outer surface of the guide portion 121a functions as a guide surface 121b. The center axis of the guide portion 121a coincides with the center axis of the turntable 121. The outer diameter of the guide portion 121a is equal to the inner diameter of the stator 101.

The turntable 121 is rotated clockwise as viewed in FIG. 17 by a motor (not shown). The rotation of the turntable 121 is synchronized with the movement of the holders 81. The turntable 121 is located on a straight line along which the coils U1 to W4 are arranged. The holders 81 carry each divisional core 6 to the turntable 121 to bring the distal end surface 6e of each tooth 6b in contact with the guide surface 121b.

The assembling process using the turntable 121 will now be described.

A holder 81 moves the first divisional core 61 on which the coil U2 has been wound from the flyer 111 toward the turntable 121. In synchronization with the movement of the holder 81 from the flyer 111 toward the turntable 121, a new divisional core 6 on which the coils U1 to W4 are yet to be wound is moved to the flyer 111. The first divisional core 61 having the coil U2 is arranged on the turntable 121. After the distal end surface 6e of the first tooth 6b is brought in contact with the guide surface 121b, the first divisional core 61 is removed from the holder 81. The holder 81 is circulated to carry another divisional core 6 to the flyer 111.

In synchronization with the movement of the holder 81, the turntable 121 is rotated clockwise by an angle of 210 degrees. Another holder 81 carries the second divisional core 62 having the coil U4 to the turntable 121. The second divisional core 62 is arranged at a position spaced from the first divisional core 61 by an angle of 210 degrees in the circumferential direction on the turntable 121. The connection wire Ud that extends from the coil U2 to the coil U4 is curved away from the turntable 121 in the axial direction of the turntable 121. The connection wire Ud is further extended in an arcuate manner curved slightly outward in the radial direction of the turntable 121.

Subsequently, the turntable 121 is rotated clockwise in synchronization by an angle of 210 degrees whenever a new divisional core 6 is carried to the flyer 111. More specifically, the assembling process is performed simultaneously with the wire winding process. The divisional cores 6 are arranged on the guide surface 121b in the order of formation of their coils U1 to W4, that is, in the order of the coils V4, V2, etc. to W1 and W3. The circled numbers in FIGS. 17 and 18 indicate the formation order of the coils U1 to W4, that is, the order in which the coils U1 to W4 are arranged on the guide surface 121b. On the turntable 121, each of the connection wires Uc to Wd extend in an arcuate manner curved slightly radially outward.

On the turntable 121, the divisional cores 6 that are adjacent to each other in the circumferential direction are pivotally connected to each other by the engagement between the round projection 11d and the round recess 11e, the engagement between the round projection 12d and the round recess 12e, and the engagement between the connecting projection 21g and the accommodating portion 21k. As a result, the twelve divisional cores 6 form the stator core 5.

After the wire winding process and the assembling process, the process for cutting the wire 25 is performed. More specifically, the portions of the wire 25 that connect the coils U1 to W4 of different phases are cut. The cutting of the wire 25 forms the lead wires 25a.

Next, the connecting wire shaping process is performed in the same manner as in the first embodiment. A shaping apparatus 361 inserts a shaping tool 364 in a shaping hole 53 that is defined by the connection wires Uc to Wd. The connection wires Uc to Wd are shaped together. This completes the stator 101.

The second embodiment has the advantages described below in addition to the advantages (3) and (8) described above.

(11) In the wire winding process, the teeth 6b are arranged parallel to one another. The divisional cores 6 that are not adjacent to each other in the circumferential direction in the assembled state of the stator 3 are arranged adjacent to and spaced from each other in the wire winding process. The second embodiment differs from the prior art in this point. When the coils are wound around the teeth in the prior art, the plurality of divisional cores are arranged in the same arrangement as when the state in which the stator is assembled and the divisional cores are arranged in the circumferential direction.

The distance between the first divisional core 61 and the second divisional core 62 in the wire winding process of the second embodiment is not restricted by other divisional cores 6. As a result, the distance between the first divisional core 61 and the second divisional core 62 that are adjacent to each other in the wire winding process is adjustable. This prevents the connection wires Uc to Wd from becoming longer.

Unlike the prior art, the distance between the divisional cores 6 that are adjacent to and spaced from each other in the wire winding process is not restricted by the dimensions of the film insulators in the circumferential direction. This provides more space for winding the coils U1 to W4 around the teeth 6b. As a result, the winding of each of the coils U1 to W4 is less likely to have other divisional cores interfering with its winding operation during the wire winding process. In other words, the formation of the coils U1 to W4 is further facilitated. Further, the winding speed of the wire 25 may be increased.

Further, the order of the divisional cores 6 around which the wire 25 is wound in the wire winding process differs from the order of the divisional cores 6 that are arranged in the circumferential direction in the assembled state of the stator 3. As a result, unlike the first winding method and the second winding method of the background art, this method can shorten the connection wires Uc to Wd.

(12) The coils U1 to W4 are continuously wound around each tooth 6b without being cut during the wire winding process. This shortens the time required for the wire winding process.

(13) The wire winding process and the assembling process are performed simultaneously. This shortens the manufacturing time as compared with when, for example, the assembling process is performed after the wire winding process is completed.

(14) In the assembling process, the connection wires Uc to Wd are curved so as to bulge in the axial direction of the turntable 121. As a result, the connection wires can be shaped to converge at the end surface of the stator core 5 in the axial direction during the connecting-wire shaping process.

(15) In the wire winding process, the length of each portion of the wire 25 that is between two consecutive coils out of the coils U1 to W4 is equal to the distance between the two coils in the circumferential direction in the assembled state of the stator 3. More specifically, the length of the portion of the wire 25 that is between the two consecutive coils is adjusted to a length that permits the portion to be arcuate and extends along the hypothetical circle C1. As a result, in the connecting-wire shaping process performed after the wire winding process, the connection wires Uc to Wd are each easily arranged along the hypothetical circle C1. In this case, the connection wires Uc to Wd are easily converged at the first end surface 5b of the stator core 5.

The above embodiments may be modified in the following forms.

Figure 19A:
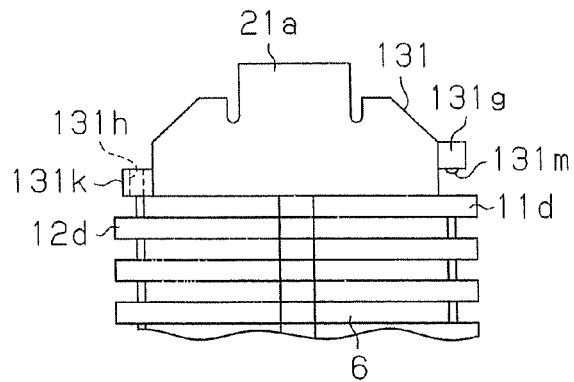
FIG. 19A is a side view of a divisional core to which an insulator of another example of the present invention has been attached.
Figure 19B:
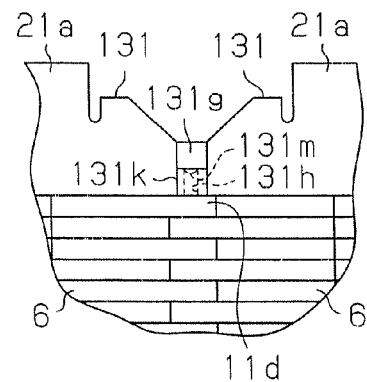
FIG. 19B is a front view of a connection between two divisional cores shown in FIG. 19A.

An insulator 131 shown in FIGS. 19A and 19B includes a cylindrical connecting portion 131k in lieu of the arcuate accommodating portion 21k. An engagement hole 131h of the connecting portion 131k extends in the axial direction of a stator core 5. The center axis of the engagement hole 131h extends through the center of the arc of a round projection 12d. The outer diameter of the connecting portion 131k is equal to the radius of curvature of the round projection 12d.

The insulator 131 further includes a cylindrical connecting portion 131g in lieu of the cylindrical connecting projection 21g and a semispherical engagement projection 131m that projects in the axial direction from the connecting portion 131g. The engagement projection 131m is engaged with the engagement hole 131h of another insulator 131.

The engagement hole 131h shown in FIG. 19A does not have to extend through the connecting portion 131k.

In FIGS. 19A and 19B, the connecting portion 131k is located between the connecting portion 131g and the divisional core 6. Alternatively, the connecting portion 131g may be located between the connecting portion 131k and the divisional core 6.

The connecting projection 21g and the accommodating portion 21k of the insulator 21 may be eliminated, and the connecting projection 21g and the accommodating portion 21k may be formed in each divisional core 6 instead. In other words, the divisional cores 6 that are adjacent to each other in the circumferential direction may be directly connected to each other.

Figure 20A:
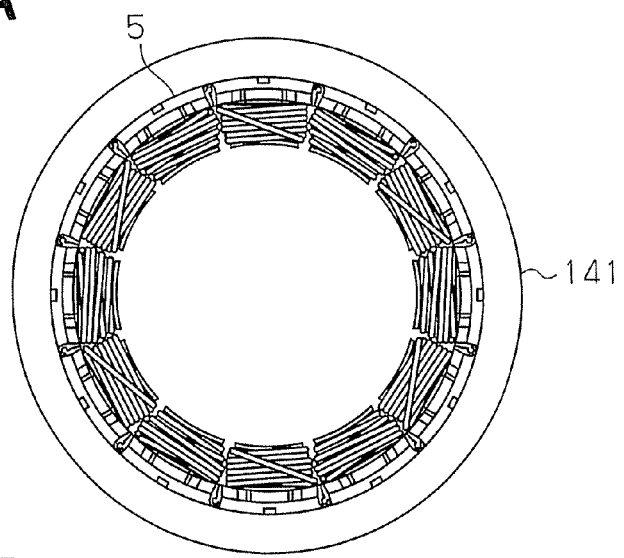
FIG. 20A is a plan view of a temporary fixing ring according to another example of the present invention.
Figure 20B:
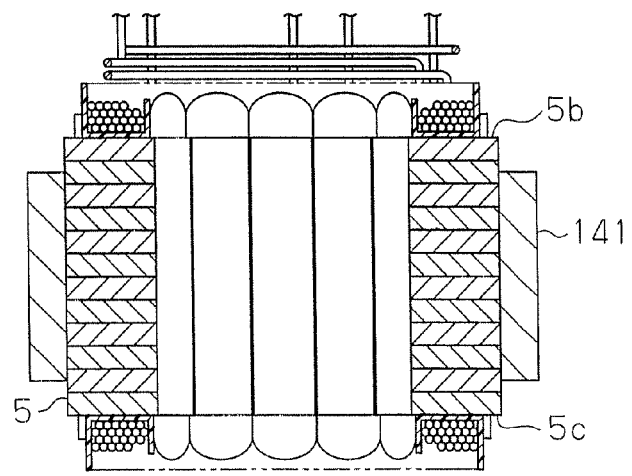
FIG. 20B is a vertical cross-sectional view of a stator on which the temporary fixing ring of FIG. 20A has been set.

As shown in FIGS. 20A and 20B, a temporary fixing ring 141 may be fixed to the outer surface of a stator core 5. The temporary fixing ring 141 prevents divisional cores 6 from moving radially during the connecting wire shaping process. For example, even when the divisional cores 6, which are connected by the engagement between the connecting projections 21g and the accommodating portions 21k, are disconnected from one another, the twelve divisional cores 6 are prevented from being separated from one another. In other words, the adjacent divisional cores 6 are prevented from being radially displaced.

The twelve divisional cores 6 may be integrated by laser welding. In this case, the connecting-wire shaping process is performed after the laser welding. When the divisional cores 6 are connected by the temporary fixing ring 141 or by laser welding, the connecting projections 21g and the accommodating portions 21k of the insulators 21 may be eliminated.

Figure 21A:
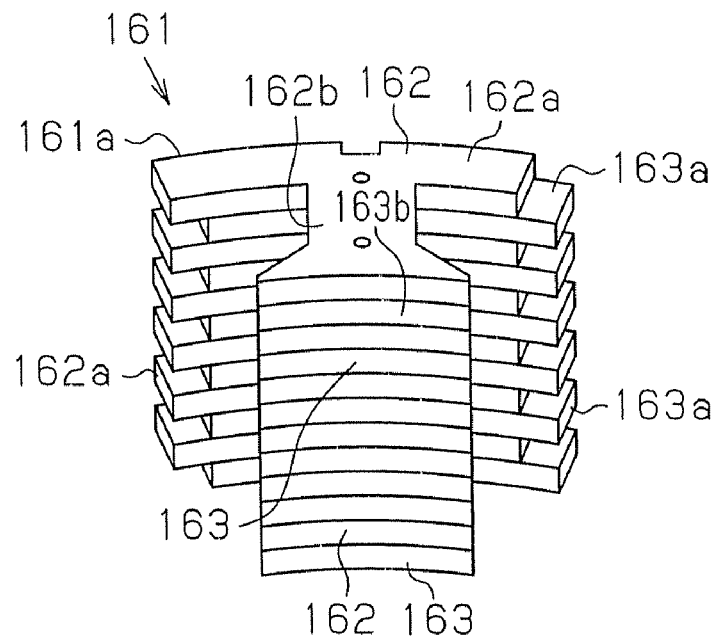
FIG. 21A is a perspective view of a divisional core according to another example of the present invention.
Figure 21B:
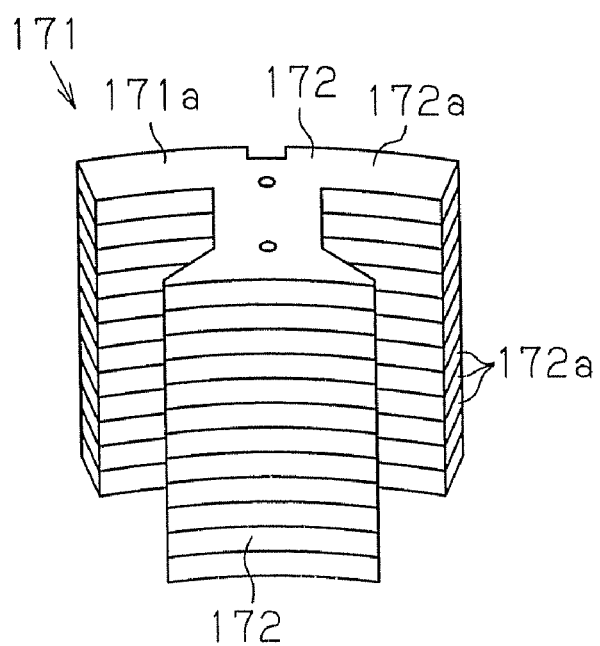
FIG. 21B is a perspective view of a divisional core according to another example of the present invention.

A divisional core 161 shown in FIG. 21A and a divisional core 171 shown in FIG. 21B do not include the round projections 11d and 12d and the round recesses 11e and 12e. The divisional core 161 has a plurality of projections and recesses at its two ends in the circumferential direction. The divisional cores 161 that are adjacent to each other in the circumferential direction are connected to each other by the engagement between the projections and recesses.

A laminated arcuate portion 162a of each first lamination member 162 has a first end (left end in FIG. 21A) in the circumferential direction and a second end (right end in FIG. 21A) opposite to the first end. The distance between the first end of the laminated arcuate portion 162a and a laminated tooth portion 162b is greater than the distance between the second end of the laminated arcuate portion 162a and the laminated tooth portion 162b.

Second lamination members 163 are reverse to the first lamination members 162. More specifically, a laminated arcuate portion 163a of each second lamination member 163 includes a first end (left end in FIG. 21A) and a second end (right end in FIG. 21A). The distance between the first end of the laminated arcuate portion 163a and a laminated tooth portion 163b is shorter than the distance between the second end of the laminated arcuate portion 163a and the laminated tooth portion 163b.

The divisional core 161 includes the first lamination members 162 and the second lamination members 163 that are laminated with one another. As a result, the two ends of the annular portions 161a in the circumferential direction include projections and recesses.

The first ends and the second ends of the laminated arcuate portions 162a and 163a lie along a plane that extends in the radial direction of the stator core 5.

The divisional core 171 shown in FIG. 21B is formed by laminating a plurality of lamination members 172 of the same type. Thus, each end surface of the divisional core 171 in the circumferential direction lies along a plane that extends in the radial direction of the stator core 5. As a result, the circumferential end surfaces of the divisional cores 171 that are adjacent to each other in the circumferential direction come in contact with each other.

The divisional cores 6 adjacent to each other in the circumferential direction do not have to be pivotally connected to each other. In the above embodiments, the divisional cores 6 that are adjacent to each other in the circumferential direction in the assembled state of the stators 3 and 101 are not connected to each other when the wire 25 is wound around the teeth 6b. Thus, the divisional cores 6 are only required to be shaped in a manner enabling assembling of the stator 3.

Figure 22:
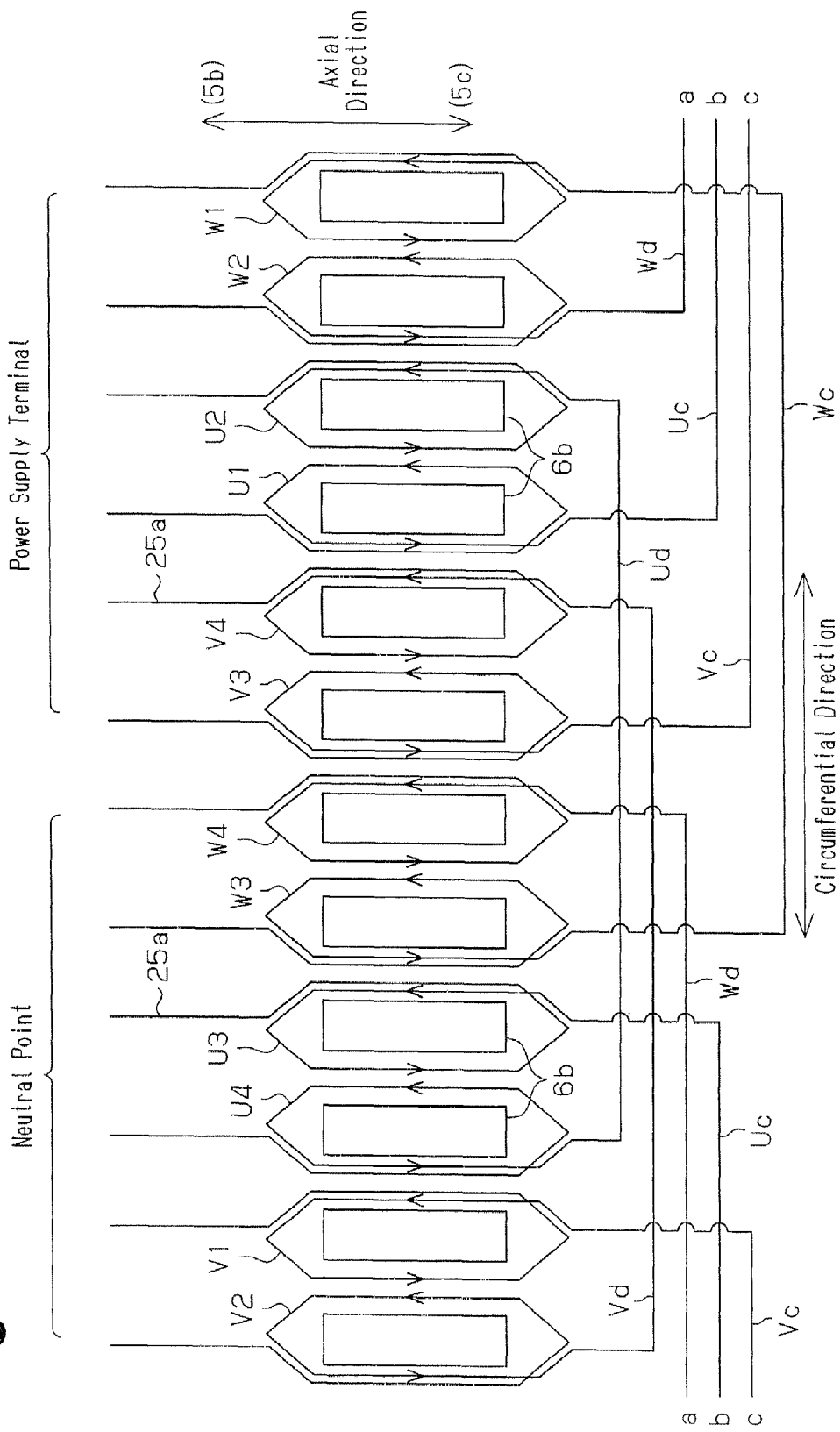
FIG. 22 is a development view of a plurality of connection wires according to another example of the present invention.

As shown in FIG. 22, a neutral point and a power supply terminal may be arranged on a second end surface 5c of a stator core 5, and connection wires Uc to Wd may be arranged on a first end surface 5b of the stator core 5. In this case, lead wires 25a do not interfere with the shaping process of the connection wires Uc to Wd. This facilitates the shaping process of the connection wires Uc to Wd. Further, the shaped connection wires Uc to Wd are easily in placed in close contact with the coils U1 to W4. In this case, the stator 101 is easily reduced in size in the axial direction.

Figure 23A:
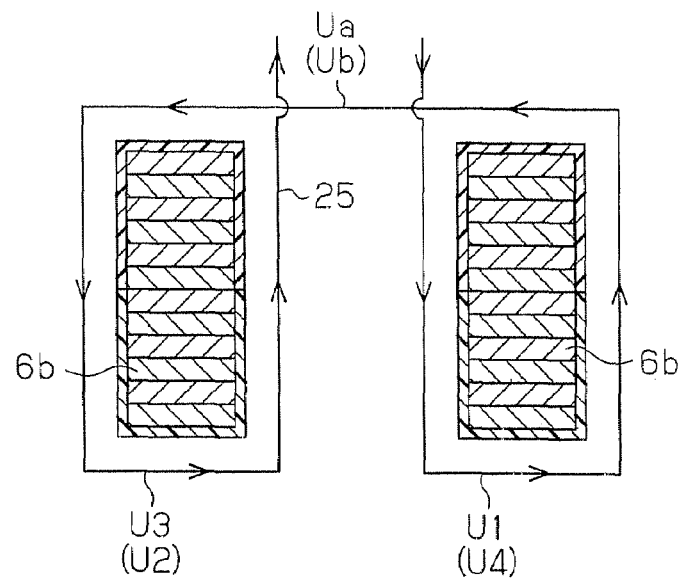
FIG. 23A is a cross-sectional view showing a winding path of a connection wire according to another example of the present invention.
Figure 23B:
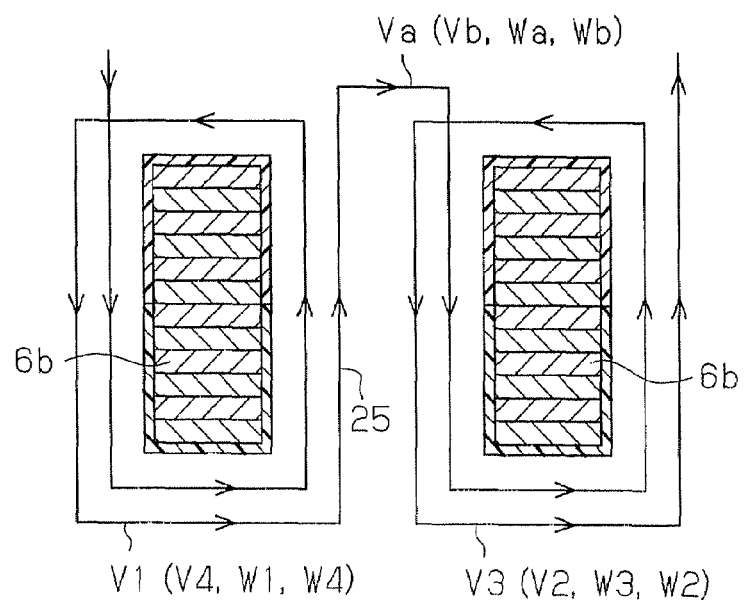
FIG. 23B is a cross-sectional view showing a winding path of a connection wire according to another example of the present invention.
Figure 24:
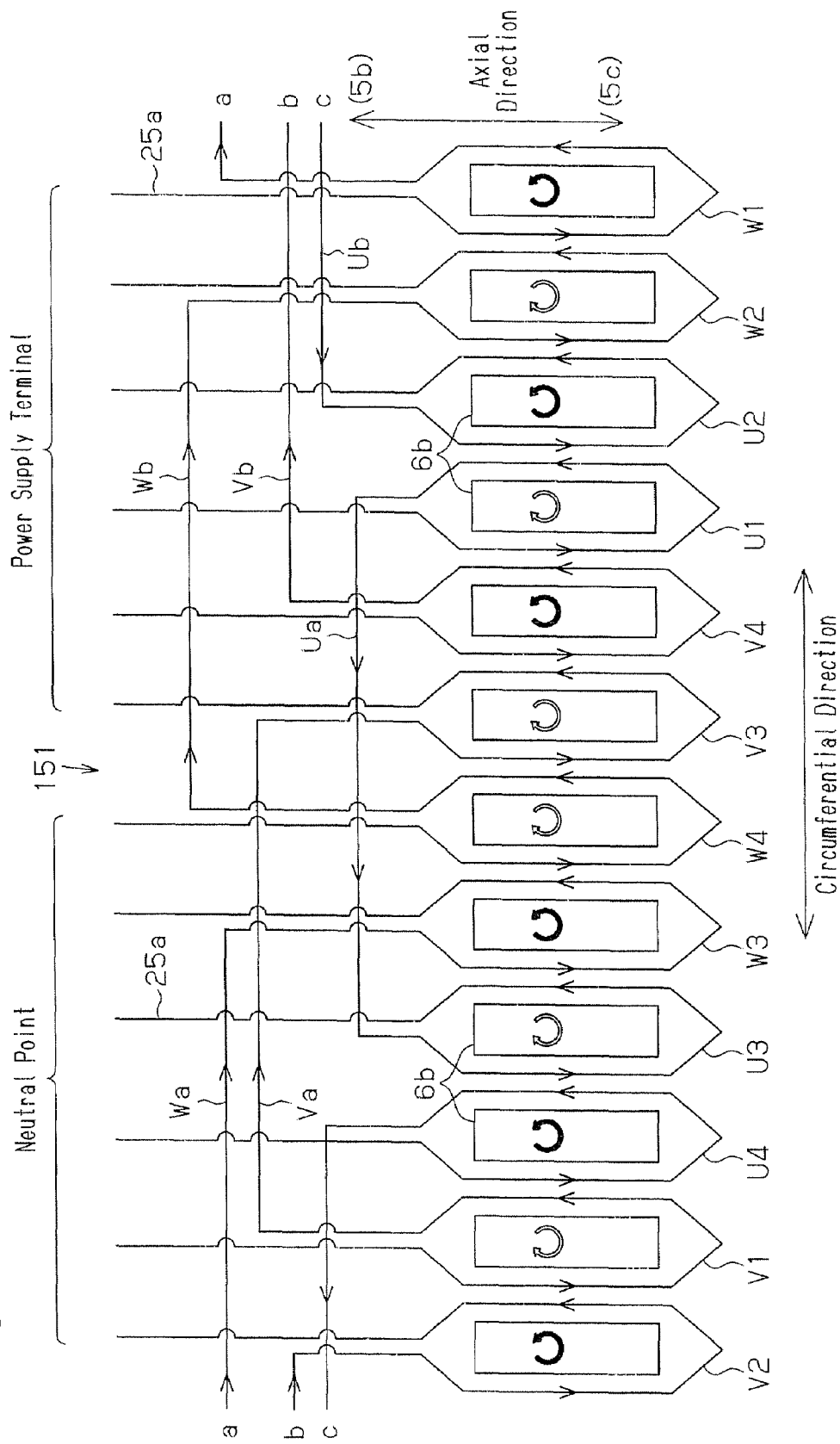
FIG. 24 is a development view of a plurality of connection wires according to another example of the present invention.

As shown in FIGS. 23B and 24, a method differing from the methods illustrated in FIGS. 4 and 7 may be used to wind the wire 25 to form the coils V1 to V4.

FIG. 23A illustrates the same method as the methods illustrated in FIGS. 4 and 7. FIG. 23A illustrates a method for winding the wire 25 to form coils U1, U2, U3, and U4. A connection wire Ua also crosses the coils U1 and U3. A connection wire Ub also crosses the coils U2 and U4.

As shown in FIGS. 23B and 24, a connection wire Va does not cross the coils V1 and V3 connected by the connection wire Va. As shown in FIG. 24, a connection wire Va crosses four coils in total between the coils V1 and V3, that is, the coils U4, U3, W3, and W4. The coils U4, U3, W3, and W4 are intermediate coils of the connection wire Va in FIG. 24.

A connection wire Vb does not cross the coils V2 and V4 connected by the connection wire Vb but crosses four intermediate coils in total, that is, the coils U1, U2, W2, and W1. A connection wire Wa does not cross the coils W1 and W3 connected by the connection wire Wa but crosses four intermediate coils in total, that is, the coils V1, V2, U4, and U3. A connection wire Wb does not cross the coils W2 and W4 connected by the connection wire Wb but crosses four intermediate coils in total, that is, the coils V3, V4, U1, and U2.

The connection wire Va shown in FIG. 24 is shorter than the connection wire Va shown in FIG. 4. Each of the connection wires Vb, Wa, and Wb shown in FIG. 24 is shorter than each of the corresponding connection wires Vb, Wa, and Wb shown in FIG. 4. As a result, the method illustrated in FIG. 24 easily reduces the wiring resistance. Further, the method illustrated in FIG. 24 facilitates the shaping of the connection wires Va, Vb, Wa, and Wd in the wire shaping process. The short connection wires Va to Wb are easily shaped to be on the first end surface 5b of the stator core 5. As a result, the manufactured stator 3 is reduced in size in the axial direction.

As shown in FIG. 24, the connection wires Va, Vb, Wa, and Wb, each of which crosses the four coils, are shorter than the connection wires Ua and Ub, each of which crosses the six intermediate coils. Thus, the method illustrated in FIG. 24 enables the six lead wires 25a that are connected to the neutral point to have a length equal to half the circumference of the stator 151. The method also enables the six lead wires 25a that are connected to the power supply terminal to have a length equal to half the circumference of the stator 151. This facilitates the process for connecting the wires to the neutral point and the power feeding terminal.

For example, the neutral point and the power supply terminal are easily formed for the same reason even when the connection wires Va and Wb of the V-phase and the W-phase are formed as shown in FIG. 23A and the connection wires Ua and Ub of the U-phase are formed as shown in FIG. 23B.

All the connection wires Ua to Wb may be formed as shown in FIG. 23B. This easily shortens all the connection wires Ua to Wb and easily reduces the wiring resistance.

In the first embodiment, the second assembling process for forming the U-phase assembly 52u, the V-phase assembly 52v, and the W-phase assembly 52w may be eliminated. In this case, the six divisional units 51 are sequentially assembled to directly form the stator core 5.

The shaping tool 364 does not have to shape all the connection wires Ua to Wb at the same time. For example, the shaping tool 364 may first shape the connection wires Ua and Ub of the U-phase, then shape the connection wires Va and Vb of the V-phase, and finally shape the connection wires Wa and Wb of the W-phase.

Figure 25A:
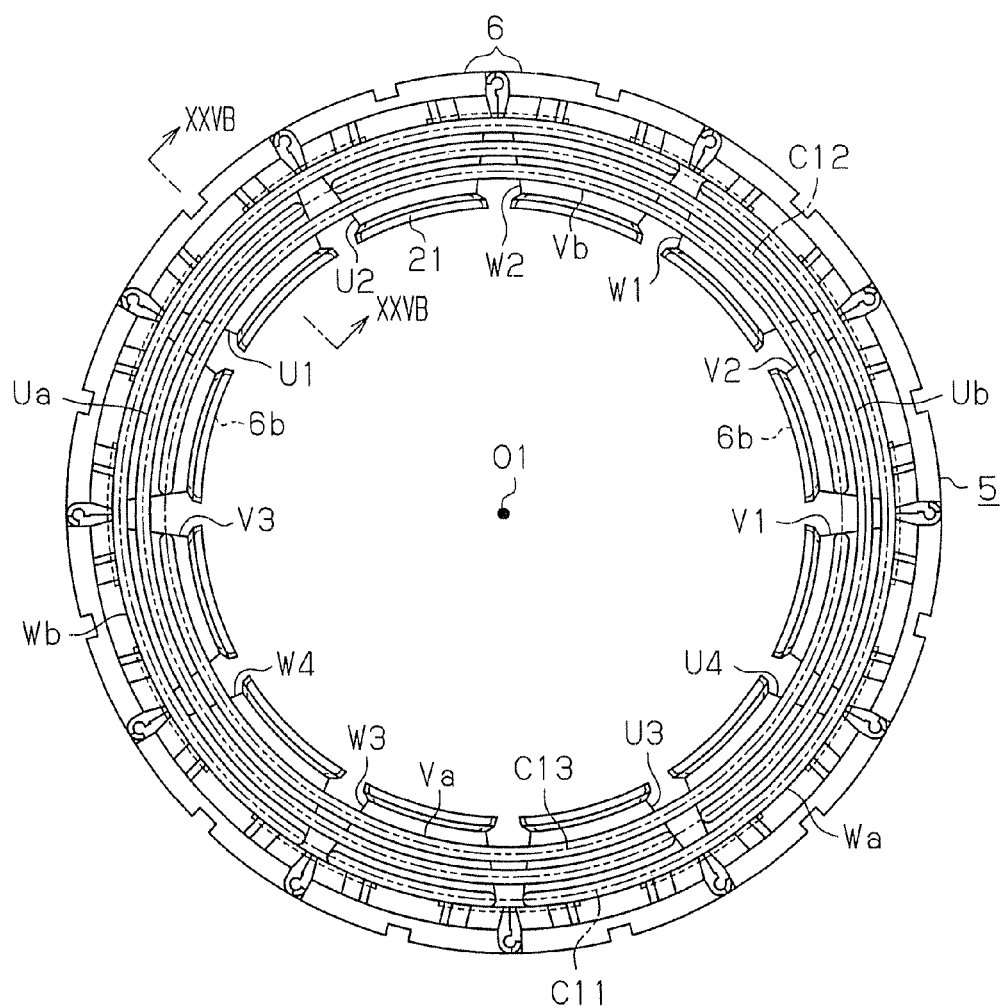
FIG. 25A is a plan view of a stator in which a plurality of connection wires according to another example of the present invention have been shaped.

As shown in FIG. 25A, connection wires Wa and Wb may be shaped to be arcuate and extends along a hypothetical circle C11, connection wires Ua and Ub may be shaped to be arcuate and extend along a hypothetical circle C12, and connection wires Va and Vb may be shaped to be arcuate and extend along a hypothetical circle C13. The hypothetical circles C11, C12, and C13 are concentric circles having a center axis O1, and are located between an outer wall 21a and an inner wall 21f. The diameter of the hypothetical circle C13 is greater than the diameter of the hypothetical circle C12. The diameter of the hypothetical circle C12 is greater than the diameter of the hypothetical circle C11.

Figure 25B:
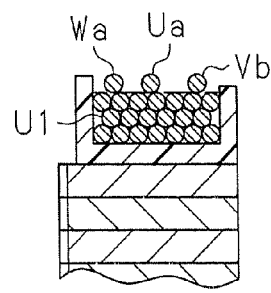
FIG. 25B is a cross-sectional view of a coil and a plurality of connection wires taken on line XXVB-XXVB of FIG. 25A.

As shown in FIGS. 25A and 25B, the connection wires Ua to Wb are arranged radially. More specifically, the connection wires Ua to Wb are easily shaped in a manner that they do not overlap in the axial direction. As a result, the stator 3 is reduced in size in the axial direction.

The coils U1 to W4 in the stator 3 do not have to be formed by alternately repeating the layout patterns A and B of the wire 25 in the circumferential direction. All the coils U1 to W4 may be formed using only the layout pattern A. Alternatively, all the coils U1 to W4 may be formed using only the layout pattern B. The layout patterns A and B may be used irregularly in the circumferential direction of the stator 3.

In the second embodiment, the process for cutting the wire 25 is performed after the wire winding process and the assembling process. However, the cutting process may be performed during the wire winding process. The cutting process may be performed during the assembling process.

In the second embodiment, the assembling process is performed simultaneously with the wire winding process. However, the assembling process may be performed after the wire winding process is performed. For example, the divisional cores 6 are arranged at equiangular intervals in either the clockwise direction or the counterclockwise direction on the turntable 121 in the order of formation of the coils, that is, first from the divisional core 6 around which the coil has been formed first.

Alternatively, the divisional cores 6 may be arranged at equiangular intervals in either the clockwise direction or the counterclockwise direction on the turntable 121 in the order reverse to the coil formation order, that is, first from the divisional core 6 around which the coil has been formed last.

In the wire winding process of the second embodiment, each holder 81 moves to the turntable 121 along a straight route orthogonal to the direction in which the teeth 6b extend. Alternatively, each holder 81 may move along an annular route. In this case, the turntable 121 may be arranged more radially outward from the track of each holder 81.

Each of the connection wires Uc to Wd in the second embodiment shown in FIG. 15 crosses six coils. Alternatively, each of the connection wires Uc, Ud, Vc, and Vd may cross four coils as shown in FIG. 26.

Figure 26:
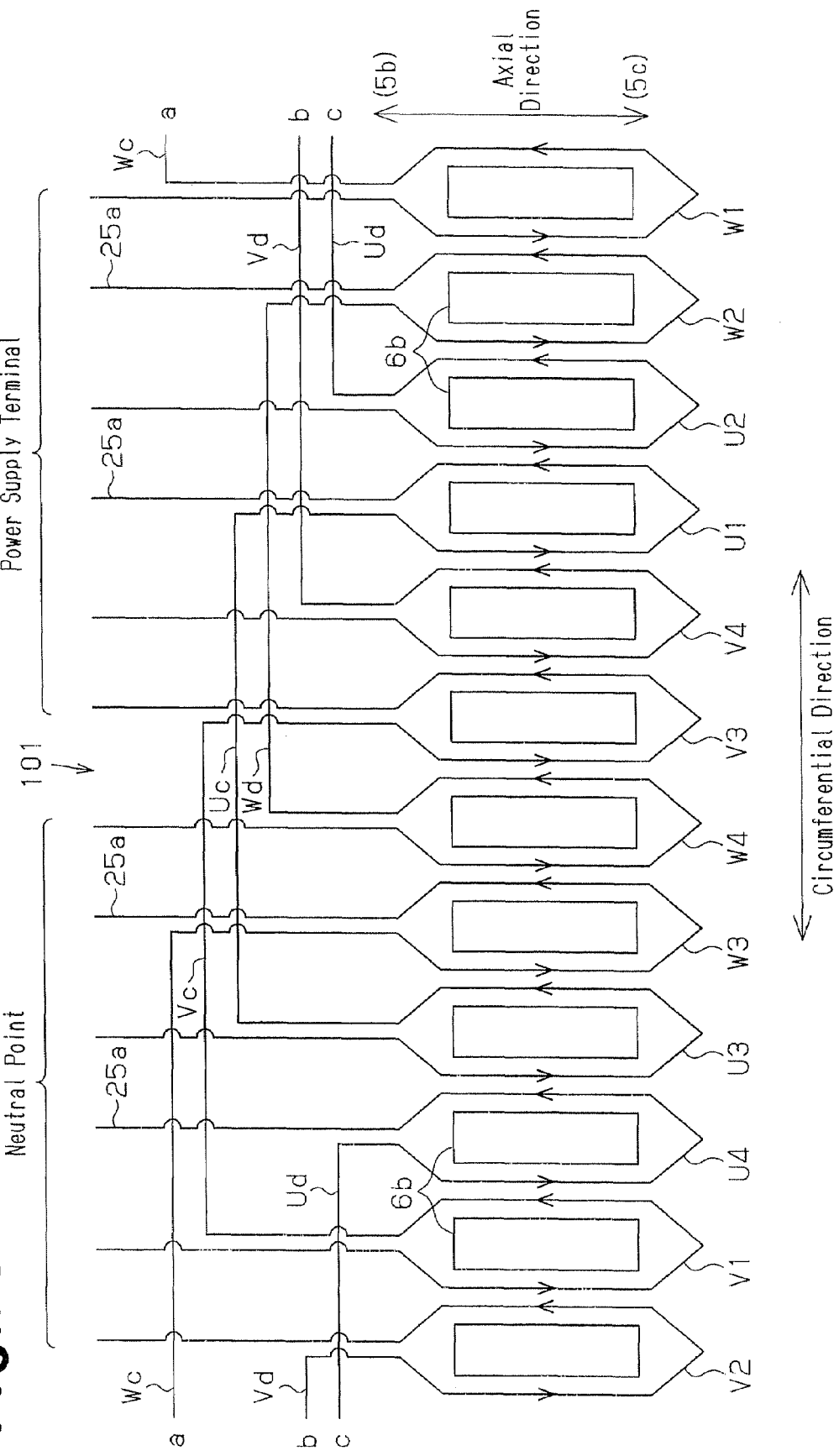
FIG. 26 is a development view of a plurality of connection wires according to another example of the present invention.

As shown in FIG. 26, the connection wire Uc crosses the coils W3, W4, V3, and V4 to extend from the coil U3 to the coil U1. The connection wire Ud crosses the coils W2, W1, V2, and V1 to extend from the coil U2 to the coil U4. The connection wire Vc crosses the coils U4, U3, W3, and W4 to extend from the coil V1 to the coil V3. The connection wire Vd crosses the coils U1, U2, W2, and W1 to extend from the coil V4 to the coil V2. The connection wire Wc crosses the coils V2, V1, U4, and U3 to extend from the coil W1 to the coil W3. The connection wire Wd crosses the coils V3, V4, U1, and U2 to extend from the coil W4 to the coil W2. In this case, the connection wires Uc to Wd may be shorter than the connection wires Uc to Wd in the second embodiment. As a result, the connection wires Uc to Wd are shaped more easily. This method easily enables the wiring resistance to be further reduced.

The winding machine 31 of the first embodiment is a spindle winding machine. In the second embodiment, the flyer 111 is used. The flyer 111 may also be used in the first embodiment. The spindle winding machine 31 may also be used in the second embodiment. Further, a nozzle type winding machine may be used.

In the wire winding process of the first embodiment, the winding machine 31 holds two divisional cores 6 in a state spaced from each other so that the distal end surfaces 6e of their teeth 6b face each other. Alternatively, for example, the winding machine 31 may hold two divisional cores 6 in a state spaced from each other so that their arcuate portions 6a face each other.

The two divisional cores 6 held by the winding machine 31 are not adjacent to each other in the circumferential direction when the stator core 5 is in the assembled state, that is, in the state in which the divisional cores 6 are arranged annularly so that their teeth 6b are positioned radially inward from the annular portions 5a. The divisional cores 6 that are adjacent to each other in the wire winding process of the second embodiment are also not adjacent to each other in the circumferential direction in the assembled state of the stator core 5. The divisional cores 6 in the wire winding process of the second embodiment are spaced from each other and their teeth 6b are arranged in parallel.

However, the divisional cores 6 arranged adjacent to each other in the wire winding process is only required to be divisional cores 6 that are not adjacent to each other in the circumferential direction when the stator core 5 is in the assembled state. The two divisional cores 6 are only required to be spaced from each other in the wire winding process and are not limited to the two divisional cores 6 described in the above embodiments.

Two coils that are connected to each other by the corresponding connection wires Ua to Wb and Uc to Wd (wire 25) are formed on the two divisional cores 6 that are adjacent to each other in the wire winding process. In the wire winding process, no other divisional core 6 is arranged between the two divisional cores 6.

The divisional cores 6 for forming the stator core 5 are not limited to the twelve divisional cores and may be more or less than the twelve divisional cores.

What is claimed is:

1. A method for manufacturing a stator including a plurality of divisional cores, wherein each divisional core has a tooth, the plurality of divisional cores including a first divisional core and a second divisional core, the manufacturing method comprising:

first, arranging a first divisional core and a second divisional core adjacent to each other;

second, winding a first coil around a tooth of the first divisional core in a concentrated winding;

third, winding a second coil around a tooth of the second divisional core in a concentrated winding, wherein the first coil is connected to the second coil by a connection wire;

fourth, arranging the plurality of divisional cores annularly in a state in which the coils are wound around the divisional cores and the plurality of teeth extend radially, the first divisional core and the second divisional core being positioned to face in a radial direction from each other when the plurality of divisional cores are arranged annularly, wherein the connection wires are each shaped to be arcuate and bulged in a radially outward direction, and wherein the connection wires project from axial end surfaces of the divisional cores;

fifth, forming a plurality of divisional units, with the divisional units each including the first divisional core and the second divisional core; and sixth, forming a stator core by assembling the plurality of divisional units together, wherein the connection wires are moved radially outward and arranged on an axial end surface of the stator.

2. The manufacturing method according to claim 1, wherein:

the connection wire is one of a plurality of connection wires;

the plurality of divisional cores include a plurality of intermediate coils arranged between the first coil and the second coil in the circumferential direction of the stator core; and when winding the second coil, the connection wires are each formed to have a length for crossing the first coil, the second coil, and the plurality of intermediate coils in the stator core.

3. A stator manufactured by the manufacturing method according to claim 2, wherein all of the connection wires each have a length for crossing the first coil, the second coil, and the plurality of intermediate coils.

4. The stator according to claim 3, wherein;

the stator includes three phases;

the stator core includes two divisional units for each phase and six divisional units in total, and the two divisional units of the same phase include two connection wires having first ends and second ends, two first divisional cores located at the first ends, and two second divisional cores located at the second ends;

the two divisional units of the same phase are adjacent to each other in the circumferential direction of the stator core;

the two first divisional cores faces the two second divisional cores of the same phase in the radial direction of the stator core; and the connection wires are each curved along the circumferential direction of the stator core.

5. The stator according to claim 4, wherein the plurality of connection wires are aligned in the radial direction of the stator core.

6. The manufacturing method according to claim 1, wherein;

the connection wire is one of a plurality of connection wires respectively corresponding to first, second, and third phases;

the first coil is one of a first coil corresponding to the first phase, a first coil corresponding to the second phase, and a first coil corresponding to the third phase;

the second coil is one of a second coil corresponding to the first phase, a second coil corresponding to the second phase, and a second coil corresponding to the third phase;

the plurality of coils include a plurality of intermediate coils corresponding to the first phase, a plurality of intermediate coils corresponding to the second phase, and a plurality of intermediate coils corresponding to the third phase;

the first connection wire is formed to have a length for crossing the plurality of intermediate coils corresponding to the first phase in the stator core;

the second connection wire is formed to have a length for crossing the first coil, the second coil, and the plurality of intermediate coils corresponding to the second phase in the stator core; and the third connection wire is formed to have a length for crossing the first coil, the second coil, and the plurality of intermediate coils corresponding to the third phase in the stator core.

7. A stator manufactured by the manufacturing method according to claim 6, wherein:

the first connection wire has a length for crossing the plurality of intermediate coils corresponding to the first phase in the stator core;

the second connection wire has a length for crossing the first coil, the second coil, and the plurality of intermediate coils corresponding to the second phase in the stator core; and the third connection wire has a length for crossing the first coil, the second coil, and the plurality of intermediate coils corresponding to the third phase in the stator core.

8. The stator according to claim 7, wherein:

the stator includes three phases;

the stator core includes two divisional units for each phase and six divisional units in total, and the two divisional units of the sane phase include two connection wires having first ends and second ends, two first divisional cores located at the first ends, and two second divisional cores located at the second ends;

the two divisional units of the sane phase are adjacent to each other in the circumferential direction of the stator core;

the two first divisional cores faces the two second divisional cores of the same phase in the radial direction of the stator core; and the connection wires are each curved along the circumferential direction of the stator core.

9. The manufacturing method according to claim 1, wherein twelve divisional cores form the stator core, said stator core formed by first assembling six divisional units together, wherein two divisional units of the same phase are arranged adjacent to each other to face two other divisional cores of the same phase.

10. A stator according to claim 1, wherein the plurality of connection wires are aligned in the radial direction of the stator core.

11. The method as set forth in claim 1, further comprising shaping the connection wire to converge at an end surface of the stator core.

12. The manufacturing method according to claim 1, further comprising using a shaping tool to shape the connection wires so that the connection wires projecting from axial end surfaces of the divisional cores are moved radially outward and arranged on the axial end surface of the stator.

* * * * *